US011719268B2

(12) United States Patent
Glozbach De Cabarrus et al.

(10) Patent No.: US 11,719,268 B2
(45) Date of Patent: Aug. 8, 2023

(54) CLOSING DEVICE FOR RELEASABLY CONNECTING A FIRST PART TO A SECOND PART

(71) Applicant: GOLEYGO GmbH, Cologne (DE)

(72) Inventors: Jerome Glozbach De Cabarrus, Cologne (DE); Tim Ley, Cologne (DE)

(73) Assignee: GOLEYGO GmbH, Cologne (DE)

( * ) Notice: Subject to any disclaimer, the term of this patent is extended or adjusted under 35 U.S.C. 154(b) by 359 days.

(21) Appl. No.: 17/045,203

(22) PCT Filed: Mar. 29, 2019

(86) PCT No.: PCT/EP2019/057994
§ 371 (c)(1),
(2) Date: Oct. 5, 2020

(87) PCT Pub. No.: WO2019/192930
PCT Pub. Date: Oct. 10, 2019

(65) Prior Publication Data
US 2021/0037792 A1  Feb. 11, 2021

(30) Foreign Application Priority Data

Apr. 5, 2018 (DE) .......................... 202018101841.8
Apr. 5, 2018 (DE) .......................... 202018108011.5
(Continued)

(51) Int. Cl.
*A44B 11/25* (2006.01)
*F16B 7/04* (2006.01)
*F16B 1/00* (2006.01)

(52) U.S. Cl.
CPC ............ *F16B 7/04* (2013.01); *A44B 11/2592* (2013.01); *A44D 2203/00* (2013.01); *F16B 2001/0035* (2013.01)

(58) Field of Classification Search
CPC ............ A44B 11/2592; A44B 11/2534; A44B 11/2515; Y10T 24/45566; Y10T 24/4567; A44D 2203/00
See application file for complete search history.

(56) References Cited

U.S. PATENT DOCUMENTS 1,851,843 A * 3/1932 Inman .................... E21B 17/046
403/DIG. 4
2,448,817 A * 9/1948 McArthur ............... F16B 9/058
403/321
(Continued)

FOREIGN PATENT DOCUMENTS

AU            21254       4/1972
CN         1818304 A      8/2006
(Continued)

OTHER PUBLICATIONS

Tenax brochure, Published Mar. 2006.
(Continued)

*Primary Examiner* — Robert Sandy
(74) *Attorney, Agent, or Firm* — Muirhead and Saturnelli, LLC

(57) ABSTRACT

A closing device for releasably connecting a first part to a second part. The closing device may have a first closing unit including a spherical engaging part, and a first retaining device for attaching the first part. The closing device also may include a second closing unit which has a second retaining device for attaching the second part, and a cut out, which is delimited by a wall, for receiving the spherical engaging part, where the cut out has an opening for inserting the spherical engaging part. A sliding unit may be located in the cut out, the sliding unit being preloaded in the direction of the opening, and the sliding unit can be displaced into an open position and a closed position. In the open position of (Continued)

the sliding unit, the spherical engaging part may be received in the cut out.

32 Claims, 11 Drawing Sheets

(30) Foreign Application Priority Data

Aug. 6, 2018 (DE) .......................... 202018104505.9
Jan. 18, 2019 (DE) .......................... 102019200658.2

(56) References Cited

U.S. PATENT DOCUMENTS

| | | | |
|---|---|---|---|
| 2,942,897 A * | 6/1960 | Eason | .................... F16B 9/054 403/317 |
| 2004/0107547 A1 | 6/2004 | Chung | |
| 2006/0174455 A1 | 8/2006 | Saitoh et al. | |
| 2010/0308605 A1 | 12/2010 | Fielder | |
| 2012/0227220 A1 | 9/2012 | Fiedler | |
| 2015/0135486 A1 | 5/2015 | Fielder et al. | |

FOREIGN PATENT DOCUMENTS

| | | |
|---|---|---|
| CN | 101571730 A | 11/2009 |
| CN | 101678785 A | 3/2010 |
| DE | 35 28 968 A1 | 2/1987 |
| DE | 43 12 032 C2 | 10/1993 |
| DE | 102007041613 A1 | 12/2008 |
| DE | 20 2009 014 812 | 3/2010 |
| EP | 1 208 762 A1 | 5/2002 |
| EP | 2 833 754 B1 | 4/2016 |
| FR | 2065741 | 8/1971 |
| WO | WO 2008/151805 A2 | 12/2008 |
| WO | WO 2009/092368 A2 | 7/2009 |
| WO | WO 2011/029582 A2 | 3/2011 |
| WO | WO 2014/102508 A2 | 8/2014 |
| WO | WO 2014/128508 A2 | 8/2014 |
| WO | WO2014/160916 A2 | 10/2014 |
| WO | WO 2017/116486 A1 | 7/2017 |

OTHER PUBLICATIONS

Product page downloaded from Amazon at https://www.amazon.de/Wallace-Jones-Anlein-Fix-Halsband-Verschlu/dp/BO1JLYFRTE?th=1 on Mar. 3, 2023 corresponding to a device from March of 2018.

Image of a bitholder "Quick" by the company Fischer, Mar. 2018.

* cited by examiner

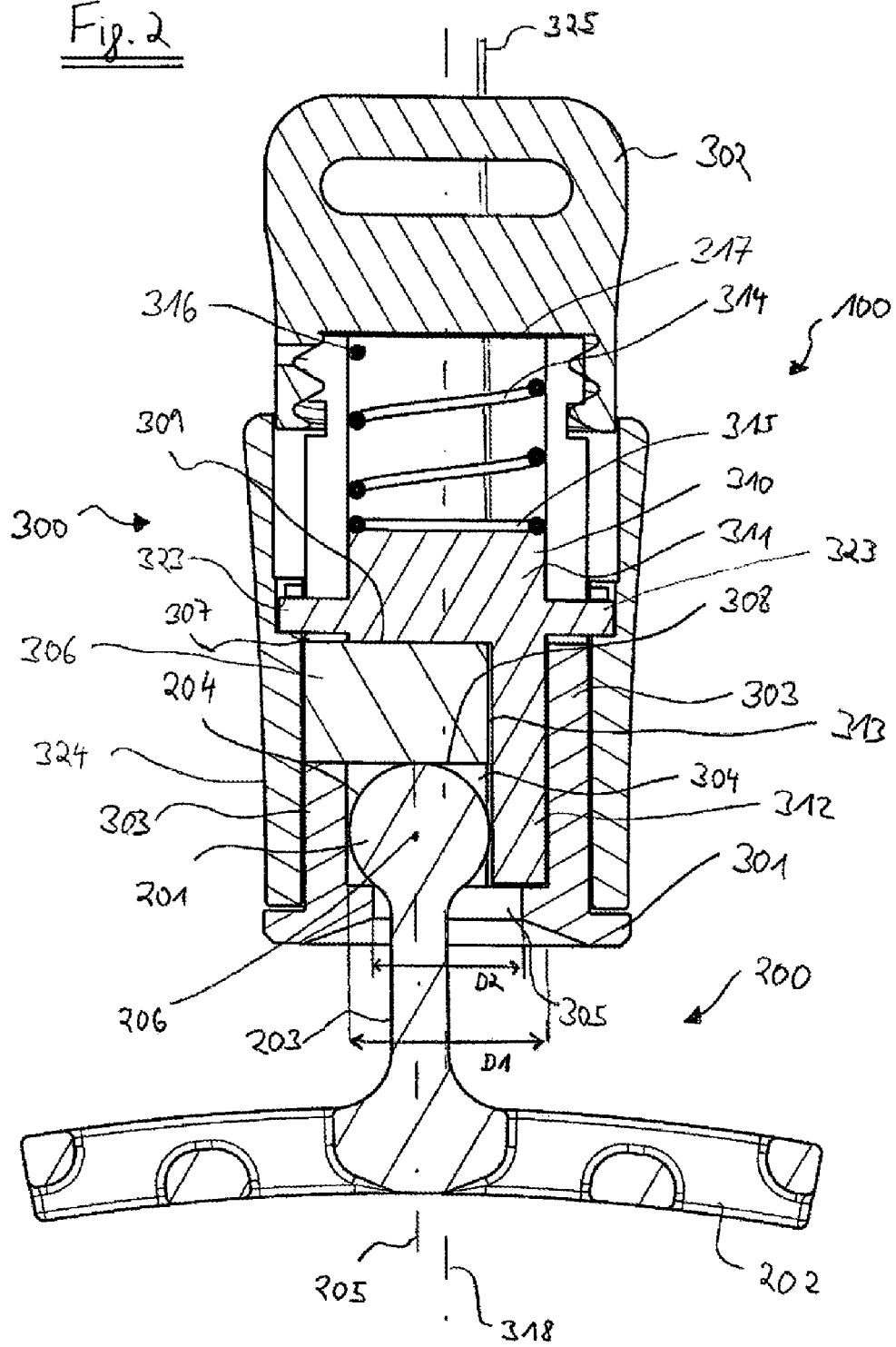

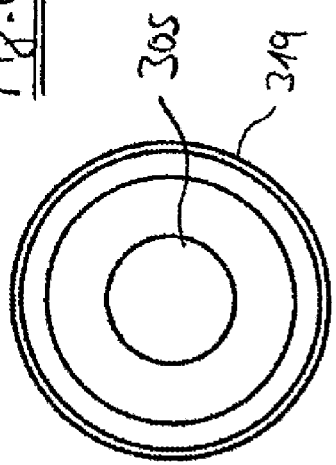
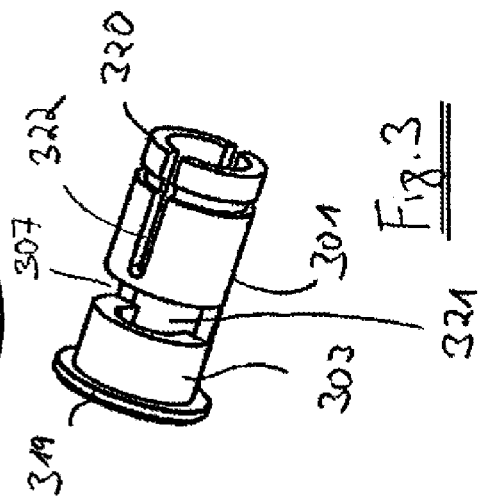
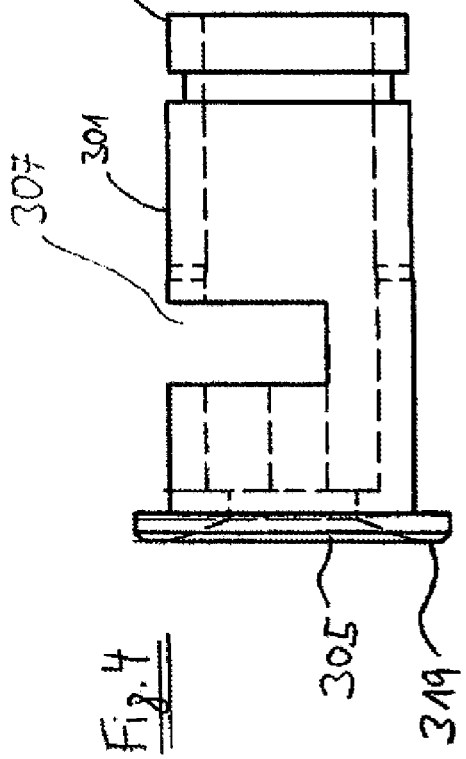
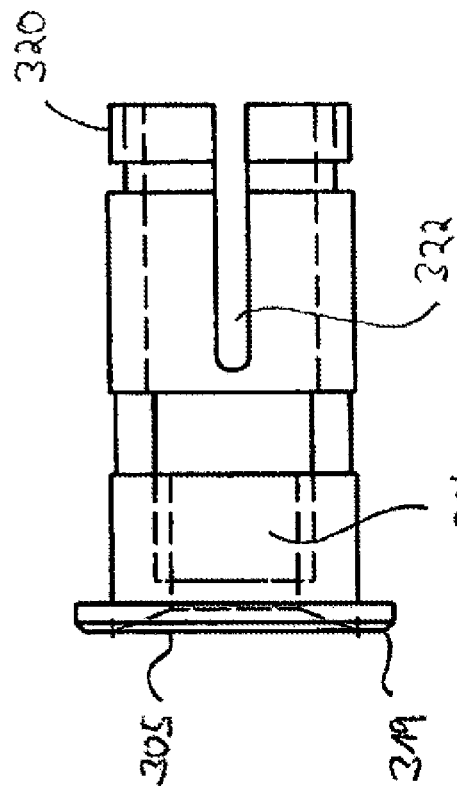

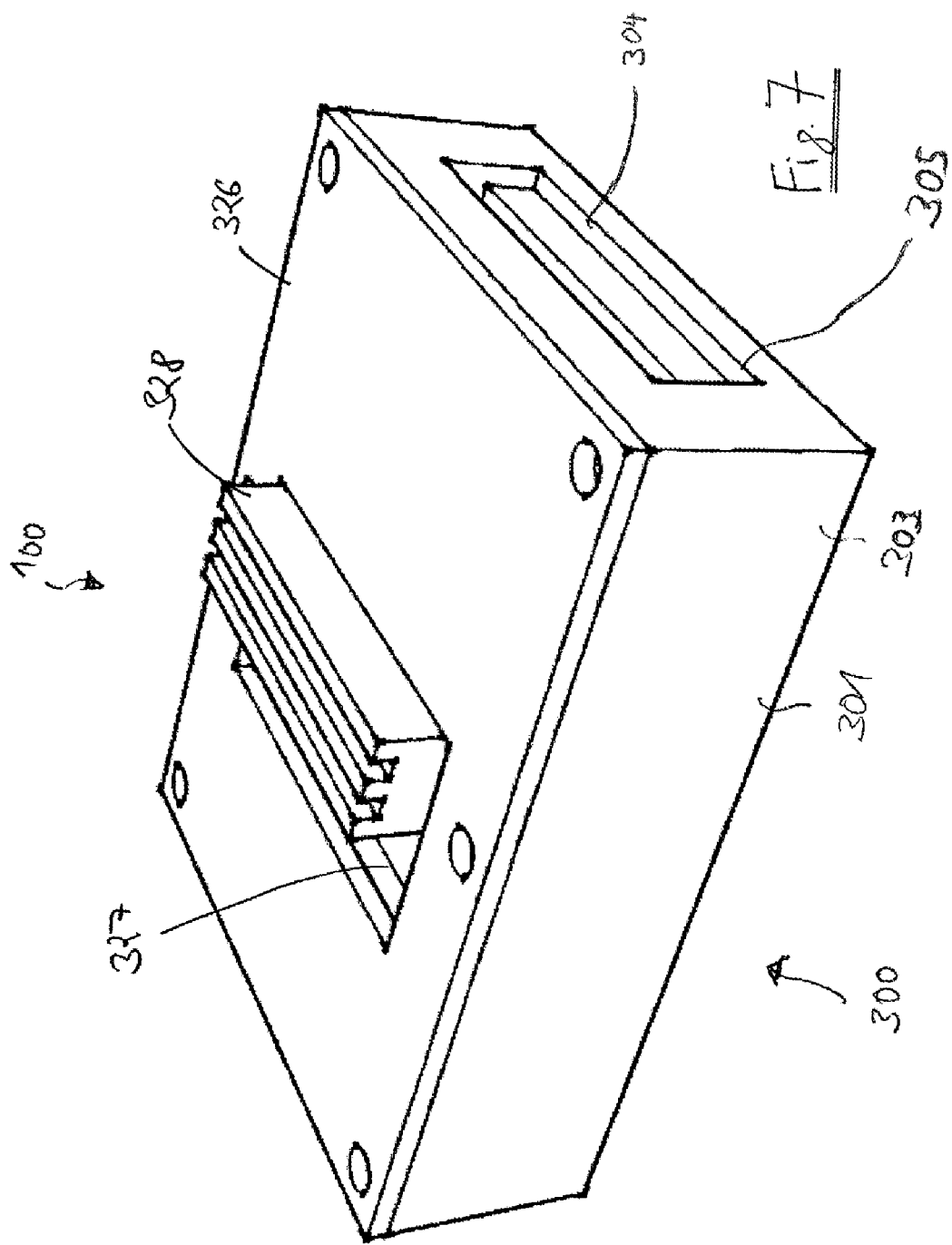

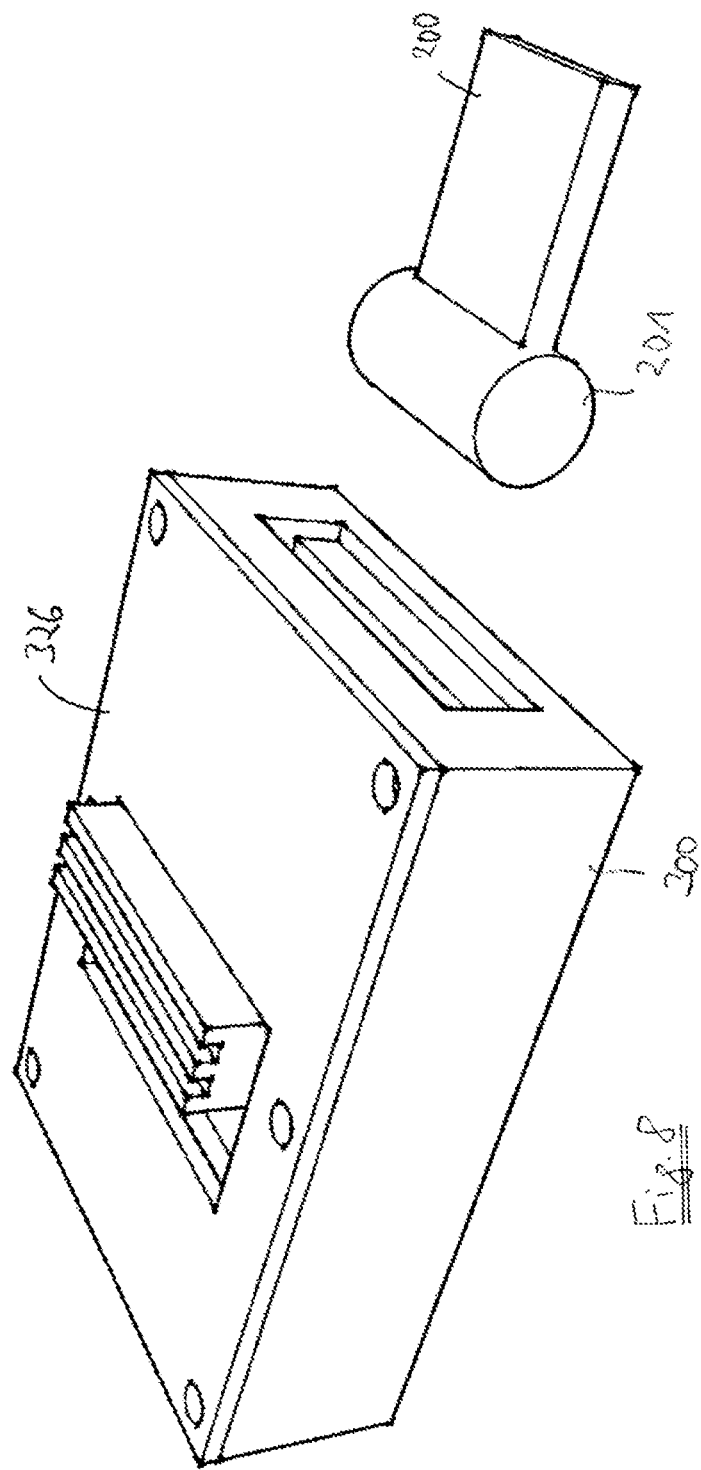

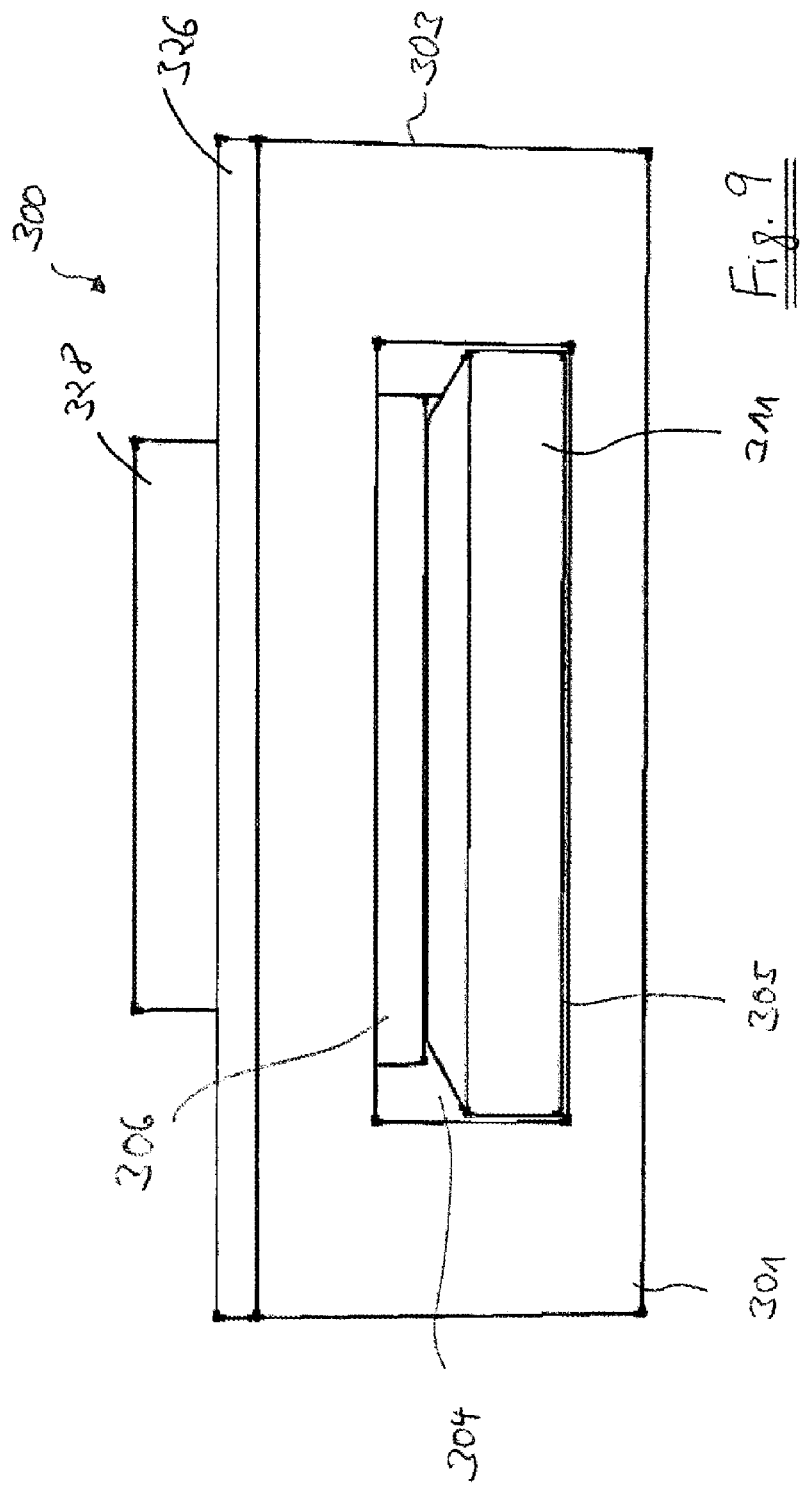

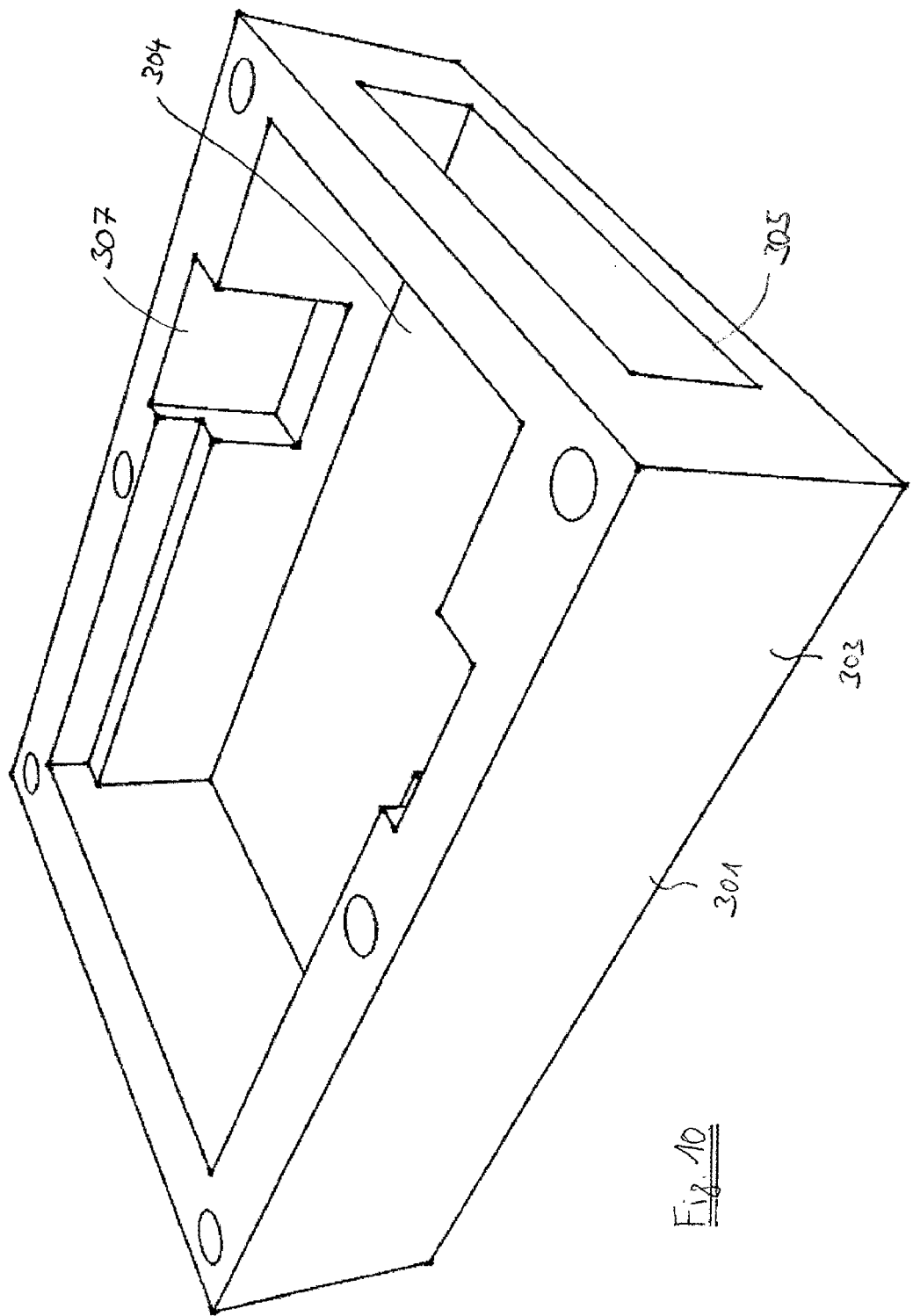

CLOSING DEVICE FOR RELEASABLY CONNECTING A FIRST PART TO A SECOND PART

TECHNICAL FIELD

The invention relates to a closing device for releasably connecting a first part to a second part. The invention is suited in particular for releasably connecting a first part to a second part in the field of sports, seafaring, the animal world, and/or industry.

BACKGROUND OF THE INVENTION

A closing device of the aforementioned kind finds application in many areas of everyday life. When an object, such as an accessory, a piece of equipment, and/or a tool is/are not intended to be permanently secured to a person and/or to another object, a simple and reliable way of releasably securing the object to the person and/or to the further object is desirable. In particular, a releasable fastening of equipment items on for example a bicycle, a baby carriage, a motor vehicle, and/or a wheelchair is desirable. Such closing devices are also desirable for dog leashes, for the rigging of sailboats, for the fastening of sails in surfing or flying kites, for the securing of objects when diving, for the securing of objects when hunting, for the securing of equipment items in the military, for horse riding, for hiking, for parachute jumping, and/or in general for aviation and space travel. Persons who carry tools along with them also want to have a reliable and releasable fastening of tools, for example on carrying vests. Such closing devices for the releasable securing of ropes for the guiding of building parts are also desirable in the field of construction, for example.

From DE 43 12 032 C2 there is known a closing device for releasably connecting a first part to a second part. The known closing device has a first closing unit with a peg which can be brought into engagement with an engagement recess on a second closing unit. When attaching it, the peg may move a locking element aside, which returns to a base position, after producing the engagement of the peg of the first closing unit with the engagement recess of the second closing unit, in which the engagement of the peg with the engagement recess is locked. To release the peg from the engagement recess, the locking element can be activated in order to release the peg and remove it from the engagement recess.

From EP 2 833 754 B1 there is known a closing device for releasably connecting two parts, having a first closing unit and a second closing unit. The first closing unit can be attached to the second closing unit for the closing of the known closing device and held in a closed position on the second closing unit. Moreover, the known closing device comprises a first engagement protrusion with undercut on the first closing unit and a second engagement protrusion with undercut on the second closing unit, wherein the first engagement protrusion can be brought into engagement with the second engagement protrusion in an engagement direction for the closure, and it stands in form fitting engagement with the second closing unit in the closed position. Moreover, the known closing device has a locking element situated on the second closing unit, which is moved out from a base position when attaching the first closing unit to the second closing unit by interacting with the first closing unit, so that the first engagement protrusion can be brought into engagement with the second engagement protrusion in the engagement direction. The first engagement protrusion returns to its base position when making the engagement or thereafter, in order to lock the form fitting engagement of the first engagement protrusion with the second engagement protrusion in its base position against the engagement direction. Magnetic means act between the first closing unit and the second closing unit, being adapted to supporting the attachment of the first closing unit to the second closing unit by providing a magnetic force of attraction.

From DE 10 2007 041 613 A1 there is known a coupling device with a spherical end fitting, which is secured to one end of a first segment. The spherical end fitting can be inserted through a receiving opening in a receiving part, which is situated at a corresponding end of a second segment. The size of the receiving opening basically corresponds to the extension of the end fitting. The receiving part is provided with a slider, which reduces the free cross section of the receiving opening after the inserting of the end fitting to a free cross section which is smaller than the extension of the end fitting. The end fitting is held in the receiving part in this way, so that a form fitting connection is produced between the first segment and the second segment.

From WO 2014/128508 A2 there is known a closing device for releasably connecting a dog collar to a leash. The known closing device has a first closing unit with a longitudinal axis. Along the longitudinal axis there extends a clamping device, fashioned in the manner of a clothes pin. The clamping device has clamping elements at one end. Moreover, the known closing device has a second closing unit with an encircling groove. In a closed position of the known closing device, the second closing unit is received in a receiving chamber of the first closing unit. In the closed position, the clamping elements of the clamping device engage with the encircling groove of the second closing unit and thus prevent a releasing of the second closing unit from the first closing unit.

It has been found that none of the known closing devices ensure a releasing of the first part from the second part under full loading. Instead, in the known closing devices, it is not even possible, or it is very difficult, to release the first part from the second part under full loading. Moreover, a movement of the first part relative to the second part is not even possible, or is hardly possible, in the closed position of the known closing devices.

SUMMARY OF THE INVENTION

Therefore, the problem which the system described herein proposes to solve is to indicate a closing device for releasably connecting a first part to a second part for which a releasing of the first part from the second part is assured under full loading and/or for which a movement of the first part relative to the second part is assured in the closed position of the closing device.

The closing device according to embodiments of the system described herein is intended for the releasable connecting of a first part to a second part. The closing device according to embodiments of the system described herein may be used in many areas of everyday life. When an object, such as an accessory, a piece of equipment, and/or a tool is/are not intended to be permanently secured to a person and/or to another object, the closing device according to embodiments of the system described herein provides a simple and reliable releasable securing of the object to the person and/or to the further object. For example, the closing device according to embodiments of the system described herein serves for the releasable fastening of equipment items, in particular on a bicycle, on a wheelchair or on a baby carriage. The closing device according to embodiments of the system described herein also may be used for dog leashes, for the rigging of sailboats, for the fastening of sails in surfing or flying kites, for the securing of objects when diving, for the securing of objects when hunting, for the securing of equipment items in the military, for horse riding, for hiking, for parachute jumping, and/or in general for aviation and space travel. Moreover, the closing device according to embodiments of the system described herein also may be suited for the releasable fastening of tools, for example, on carrying vests. The closing device according to embodiments of the system described herein also may be used in construction for the releasable securing of ropes for the guiding of building parts. The aforementioned listing of possible uses of the closing device according to embodiments of the system described herein is not to be understood as definitive, but rather it is only an example. Accordingly, the closing device according to embodiments of the system described herein may be used for any application to which the closing device according to embodiments of the system described herein is suited, especially in the areas of sports, seafaring, the animal world, and industry.

The closing device according to embodiments of the system described herein may comprise a first closing unit, the first closing unit having a spherical engaging part and a first retaining device mounted on the spherical engaging part for attaching the first part. In other words, the first part which is to be releasably connected to the second part may be arranged on the first retaining device. The spherical engaging part may have a spherical head, for example, on which the first retaining device may be situated. For example, the first retaining device may be formed at least partially as a rod.

Moreover, the closing device according to embodiments of the system described herein may comprise a second closing unit, which may be provided with a second retaining device for attaching the second part. Moreover, the second closing unit may be provided with a cut out which may be delimited by a wall for receiving the spherical engaging part of the first closing unit. The cut out of the second closing unit may have an opening for inserting the spherical engaging part of the first closing unit, the spherical engaging part of the first closing unit being held in a closed position of the closing device for the closing of the closing device in the cut out of the second closing unit.

A sliding unit may be located in the cut out of the second closing unit, said sliding unit being preloaded in the direction of the opening of the cut out of the second closing unit. Furthermore, the sliding unit may be moved into an open position and a closed position along the wall of the cut out of the second closing unit in the cut out of the second closing unit. In other words, the sliding unit may be moved into two positions, namely a first position in the form of an open position, and a second position in the form of a closed position, the sliding unit being guided for example along the wall of the cut out, for example.

In the open position of the sliding unit, the spherical engaging part of the first closing unit may be inserted into and/or received in the cut out of the second closing unit through the opening of the cut out of the second closing unit. In the closed position of the sliding unit, the sliding unit may delimit an extension of the cut out of the second closing unit. Basically, the sliding unit in the closed position reduces the extension of the cut out such that the extension of the cut out may be smaller than the spherical engaging part arranged in the cut out. Moreover, in the closed position of the sliding unit, which may be the closed position of the closing device, the spherical engaging part of the first closing unit may lie against both the wall of the cut out of the second closing unit and against the sliding unit. The spherical engaging part may be then held clamped between the wall of the cut out of the second closing unit and the sliding unit.

Furthermore, it may be provided in the closing device according to embodiments of the system described herein that the spherical engaging part of the first closing unit is magnetic. For example, the spherical engaging part may be ferromagnetic. In particular, it may be provided that the spherical engaging part is made of iron. Moreover, a magnetic unit may be arranged in the cut out of the second closing unit, which may interact with the magnetically formed spherical engaging part of the first closing unit.

It is explicitly pointed out that embodiments of the system described herein also encompass embodiments in which the spherical engaging part and/or a unit of the second closing unit which interacts with the spherical engaging part is/are not magnetic.

In one embodiment of the closing device according to embodiments of the system described herein, the spherical engaging part and/or the magnetic unit is/are formed as a permanent magnet. For example, the spherical engaging part and/or the magnetic unit may be formed from a magnet made at least partly of neodymium. However, the system described herein is not limited to the aforementioned material as regards a magnet. Instead, any given magnetic materials which are suitable for embodiments of the system described herein may be used for the closing device according to embodiments of the system described herein.

The closing device according to embodiments of the system described herein has the advantage that, owing to its particular configuration, especially owing to the use of the spherical engaging part of the first closing unit and the sliding unit of the second closing unit, a releasing of the first part from the second part under full loading may be assured. In addition, a secure holding of the spherical engaging part of the first closing unit in the cut out of the second closing unit may be assured owing to the sliding unit, especially owing to a form fitting connection of the sliding unit to the spherical engaging part of the first closing unit and especially owing to a form fitting connection of the spherical engaging part to the wall of the cut out. Moreover, a movement of the first part relative to the second part may be possible in the closed position of the closing device according to embodiments of the system described herein. For example, the spherical engaging part may be turned by up to 360° about a first axis of rotation. In addition or alternatively, the spherical engaging part may swivel by as much as 45° about a second axis of rotation, the first axis of rotation being oriented perpendicular to the second axis of rotation.

As mentioned above, in one embodiment of the closing device according to embodiments of the system described herein, the spherical engaging part of the first closing unit is held rotatably in the cut out of the second closing unit in the closed position of the sliding unit. For example, the spherical engaging part of the first closing unit may have a longitudinal axis extending in the direction of and/or along the first retaining device and the spherical engaging part of the first closing unit is held in the cut out rotatably about this longitudinal axis. For example, the spherical engaging part may turn about this longitudinal axis by as much as 360°. This embodiment of the system described herein may ensure an especially good movement of the first closing unit relative to the second closing unit and thus also an especially good movement of the first part relative to the second part, the first part being releasably connected to the second part via the closing device.

In another embodiment of the closing device according to embodiments of the system described herein, the closing device has one of the following features: (i) the spherical engaging part of the first closing unit is held in the cut out rotatably along an envelope surface of a cone, a rotational axis of the spherical engaging part running through an apex of the cone, and (ii) the spherical engaging part of the first closing unit is held in the cut out rotatably along an envelope surface of a cone, a rotational axis of the spherical engaging part running through an apex of the cone, the apex of the cone being situated on a spherical formation of the spherical engaging part. For example, the half aperture angle of the cone may be as much as 45°. In particular, the first closing unit may swivel about an angle of as much as 45°. These embodiments of the system described herein also may ensure an especially good movement of the first closing unit relative to the second closing unit and thus also an especially good movement of the first part relative to the second part, the first part being releasably connected to the second part via the closing device.

In yet another embodiment of the closing device according to embodiments of the system described herein, the magnetic unit delimits the cut out of the second closing unit, and the spherical engaging part of the first closing unit is arranged on the magnetic unit especially in the closed position of the sliding unit. For example, the spherical engaging part in the closed position of the sliding unit may lie against the magnetic unit. This embodiment of the system described herein may ensure an especially good holding of the spherical engaging part of the first closing unit in the cut out of the second closing unit, especially in the closed position of the sliding unit.

In one embodiment of the closing device according to embodiments of the system described herein, the magnetic unit may comprise a first outer side and a second outer side. The first outer side may be oriented toward the opening of the cut out. On the other hand, the second outer side may be situated opposite the first outer side. In particular, the first outer side and the second outer side of the magnetic unit may be spaced apart from each other. Moreover, in the closed position of the sliding unit, the sliding unit may be arranged on the second outer side. On the other hand, for example, the spherical engaging part of the first closing unit may be arranged on the first outer side of the magnetic unit in the closed position of the sliding unit on the first unit. In particular, the spherical engaging part of the first closing unit may lie against the first outer side of the magnetic unit.

In another embodiment of the closing device according to embodiments of the system described herein, the sliding unit has a prolongation, which extends along a side surface of the magnetic unit in the direction of the opening of the cut out of the second closing unit. For example, the prolongation of the sliding unit may be situated on a base part of the sliding unit, the base part being situated on the second outer side of the magnetic unit in the closed position of the sliding unit. The prolongation of the sliding unit may be situated on the base part of the sliding unit such that the prolongation extends from the base part in the direction of the opening of the cut out along a side surface of the magnetic unit. The side surface of the magnetic unit may be oriented, for example, perpendicular or substantially perpendicular to the first outer side and/or to the second outer side of the magnetic unit. The prolongation of the sliding unit may be provided in particular to lie against the spherical engaging part of the first closing unit in the closed position of the sliding unit, so that the spherical engaging part of the first closing unit is held clamped between the wall of the cut out of the second closing unit and the prolongation of the sliding unit.

In yet another embodiment of the closing device according to embodiments of the system described herein, the second closing unit may comprise a wall cut out, in which the magnetic unit is situated. For example, the wall cut out may be formed as a slot, in which the magnetic unit may be arranged with force locking and/or form fitting. For example, the magnetic unit may protrude from the wall cut out into the cut out of the second closing unit. In particular, the wall cut out may be formed as a holder for the magnetic unit. This may ensure that the magnetic unit is arranged and held especially easily and securely on the second closing unit.

In one embodiment of the closing device according to embodiments of the system described herein, the second closing unit may comprise a spring element. The spring element may have a first end and a second end. The first end of the spring element may be braced against the sliding unit. On the other hand, the second end of the spring element may be braced against a support wall of the second closing unit. This embodiment of the closing device according to embodiments of the system described herein may ensure with simple and economical means an especially good preloading of the sliding unit in the direction of the opening of the cut out. For example, the spring element may be formed as a helical spring. However, the system described herein is not limited to the use of a helical spring. Instead, any manner of spring and any manner of spring material which is suited to embodiments of the system described herein may be used as the spring element.

In another embodiment of the closing device according to embodiments of the system described herein, the support wall is situated on the second retaining device for the mounting of the second part. In particular, the second retaining device may be releasably secured on the second closing unit. For example, the second retaining device may be screwed onto the second closing unit. This embodiment may ensure that the cut out of the second closing unit is easily accessible when assembling the closing device according to embodiments of the system described herein, and the sliding unit as well as the magnetic unit may be easily mounted in the cut out of the second closing unit. In an alternative embodiment, the second retaining device is joined as a single piece to the second closing unit or it is arranged on the second closing unit, for example, by means of a glued connection.

In another embodiment of the closing device according to embodiments of the system described herein, the sliding unit is arranged on a first activating device. The first activating device may interact with the sliding unit. In other words, it may be possible with the first activating device to move the sliding unit from the closed position to the open position and back, for example. For example, the first activating device may be arranged on the support wall of the second retaining device. In one embodiment of the closing device according to embodiments of the system described herein, the activating device is formed as a Bowden cable, which is arranged on the sliding unit and led through an opening on the second retaining device. This embodiment of the closing device according to embodiments of the system described herein may ensure an especially easy releasing of the first part from the second part by operating the first activating device, especially under a full loading.

In yet another embodiment of the closing device according to embodiments of the system described herein, the sliding unit is arranged on a second activating device. The second activating device may interact with the sliding unit. In other words, it may be possible with the second activating device to move the sliding unit from the closed position to the open position and back, for example. In this embodiment, the second activating device may be arranged on an outer side of the second closing unit. For example, the second activating device may be formed as a sleeve which may be inverted over the second closing unit. In particular, in one embodiment the second activating device is connected by at least one pin to the sliding unit. This embodiment of the closing device according to embodiments of the system described herein also may ensure an especially easy releasing of the first part from the second part by operating the second activating device, especially under a full loading.

In one embodiment of the closing device according to embodiments of the system described herein, the extension of the cut out of the second closing unit is larger than the extension of the opening of the second closing unit. The extension of the cut out may be dictated by the distance between two opposite points of the wall of the cut out, where the distance may be the length of a straight line oriented perpendicular to a longitudinal axis, the longitudinal axis running through the cut out and through the opening of the second closing unit. Moreover, the extension of the opening may be dictated by the distance of two opposite points of the boundary of the opening, where the distance may be the length of a straight line oriented perpendicular to a longitudinal axis, the longitudinal axis running through the cut out and through the opening of the second closing unit. For example, the opening of the cut out may be circular and/or cylindrical. The cut out may be cylindrical. If the cross section of the cut out and the cross section of the opening are circular, the diameter of the cut out may be larger than the diameter of the opening. The diameter of the cut out may be decreased in the closed position of the sliding unit, so that the diameter of the cut out is less than the diameter of the spherical engaging part. The spherical engaging part then may be held securely in the cut out of the second closing unit.

In another embodiment of the closing device according to embodiments of the system described herein, the second closing unit is sleeve shaped. However, the system described herein is not limited to the aforementioned configuration of the second closing unit. Instead, the second closing unit may have any desired configuration which is suited to embodiments of the system described herein, such as a cylindrical configuration, a cuboidal configuration, and/or also a spherical configuration.

As already stated above, in one embodiment of the closing device according to embodiments of the system described herein, the spherical engaging part is made of iron.

In another embodiment of the closing device according to embodiments of the system described herein, the sliding unit is arranged on an activating device and the activating device is formed as a pressure switch for redirecting a force to move the sliding unit. For example, the pressure switch may interact with a movement unit or with multiple movement units, which then move(s) the sliding unit. In other words, with the activating device it becomes possible to move the sliding unit from the closed position to the open position and back, for example.

A further closing device according to embodiments of the system described herein may comprise, for example, at least one of the aforementioned features or a combination of at least two of the aforementioned features. The further closing device according to embodiments of the system described herein may comprise a first closing unit, the first closing unit comprising an engaging part and a first retaining device mounted on the engaging part for attaching the first part. In other words, the first part which is to be releasably connected to the second part may be arranged on the first retaining device. The engaging part may have a spherical head, for example, on which the first retaining device may be situated. For example, the first retaining device may be formed at least partially as a rod.

Moreover, the further closing device according to embodiments of the system described herein may comprise a second closing unit, which may be provided with a second retaining device for attaching the second part. Moreover, the second closing unit may be provided with a cut out which may be delimited by a wall for receiving the engaging part of the first closing unit. The cut out of the second closing unit may have an opening for inserting the engaging part of the first closing unit, and the engaging part of the first closing unit may be held in a closed position of the further closing device for the closing of the further closing device in the cut out of the second closing unit.

A sliding unit may be located in the cut out of the second closing unit, said sliding unit being preloaded in the direction of the opening of the cut out of the second closing unit. Furthermore, the sliding unit may be moved into an open position and a closed position along the wall of the cut out of the second closing unit in the cut out of the second closing unit. In other words, the sliding unit may be moved into two positions, namely a first position in the form of an open position, and a second position in the form of a closed position, the sliding unit being guided for example along the wall of the cut out, for example.

In the open position of the sliding unit, the engaging part of the first closing unit may be inserted into and/or received in the cut out of the second closing unit through the opening of the cut out of the second closing unit. In the closed position of the sliding unit, the sliding unit may delimit an extension of the cut out of the second closing unit. Basically, the sliding unit in the closed position may reduce the extension of the cut out such that the extension of the cut out is smaller than the engaging part arranged in the cut out. Moreover, in the closed position of the sliding unit, which is the closed position of the further closing device, the engaging part of the first closing unit may lie against both the wall of the cut out of the second closing unit and against the sliding unit. The engaging part then may be held clamped between the wall of the cut out of the second closing unit and the sliding unit.

Furthermore, in the further closing device according to embodiments of the system described herein, the engaging part of the first closing unit may be magnetic. For example, the engaging part may be ferromagnetic. In particular, the engaging part may be made of iron. Moreover, a magnetic unit may be arranged in the cut out of the second closing unit, which may interact with the magnetically formed engaging part of the first closing unit.

The further closing device according to embodiments of the system described herein may have the same functions and advantages as already explained above.

It is explicitly pointed out that the system described herein also encompasses embodiments in which the engaging part and/or a unit of the second closing unit which interacts with the engaging part is/are not magnetic.

In one embodiment of the further closing device according to embodiments of the system described herein, the engaging part and/or the magnetic unit may be formed as a permanent magnet. For example, the engaging part and/or the magnetic unit may be formed from a magnet made at least partly of neodymium. However, the system described herein is not limited to the aforementioned material as regards a magnet. Instead, any given magnetic materials which are suitable for embodiments of the system described herein may be used for the further closing device according to embodiments of the system described herein.

In one embodiment of the further closing device according to embodiments of the system described herein, the engaging part of the first closing unit has a radius on an outer contour of the engaging part. For example, the engaging part of the first closing unit may be rod shaped and/or spherical.

Yet another closing device for releasably connecting a first part to a second part finds application in many areas of everyday life. When an object, such as an accessory, a piece of equipment, and/or a tool is/are not intended to be permanently secured to a person and/or to another object, a simple and reliable way of releasably securing the object to the person and/or to the further object may be provided by the closing device according to embodiments of the system described herein. For example, the further closing device according to embodiments of the system described herein may serve for a releasable fastening of equipment items especially on a bicycle, a wheelchair, or a baby carriage. The further closing device according to embodiments of the system described herein also may be suitable for dog leashes, for the rigging of sailboats, for the fastening of sails in surfing or flying kites, for the securing of objects when diving, for the securing of objects when hunting, for the securing of equipment items in the military, for horse riding, for hiking, for parachute jumping, and/or in general for aviation and space travel. Moreover, the further closing device according to embodiments of the system described herein also may be suitable for the releasable fastening of tools, for example on carrying vests. The further closing device according to embodiments of the system described herein also may be used for the releasable securing of ropes for the guiding of building parts in the field of construction. The aforementioned listing of possible uses of the further closing device according to embodiments of the system described herein is not to be understood as definitive, but rather it is only an example. Accordingly, the further closing device according to embodiments of the system described herein may be used for any application to which the further closing device according to embodiments of the system described herein is suited, especially in the areas of sports, seafaring, the animal world, and industry.

The further closing device according to embodiments of the system described herein may comprise a first closing unit, the first closing unit having an engaging part and a first retaining device mounted on the engaging part for attaching the first part. In other words, the first part which is to be releasably connected to the second part may be arranged on the first retaining device. The engaging part may have a spherical head, for example, on which the first retaining device may be situated. For example, the first retaining device may be formed at least partially as a rod.

Moreover, the further closing device according to embodiments of the system described herein may comprise a second closing unit, which may be provided with a second retaining device for attaching the second part. Moreover, the second closing unit may be provided with a cut out for receiving the engaging part of the first closing unit. The cut out of the second closing unit may have an opening for inserting the engaging part of the first closing unit, the engaging part of the first closing unit being held in a closed position of the closing device for the closing of the closing device in the cut out of the second closing unit.

A sliding unit may be located in the cut out of the second closing unit, said sliding unit being preloaded in the direction of the opening of the cut out of the second closing unit. Furthermore, the sliding unit may be moved into an open position and a closed position along a wall of the cut out of the second closing unit in the cut out of the second closing unit. In other words, the sliding unit may be moved into two positions, namely a first position in the form of an open position, and a second position in the form of a closed position, the sliding unit being guided for example along the wall of the cut out, for example.

In the open position of the sliding unit, the engaging part of the first closing unit may be inserted into and/or received in the cut out of the second closing unit through the opening of the cut out of the second closing unit. In the closed position of the sliding unit, the sliding unit may delimit an extension of the cut out of the second closing unit. Basically, the sliding unit in the closed position may reduce the extension of the cut out such that the extension of the cut out is smaller than the engaging part arranged in the cut out. Moreover, in the closed position of the sliding unit, which is the closed position of the further closing device, the engaging part of the first closing unit may lie against both the wall of the cut out of the second closing unit and against the sliding unit. The engaging part then may be held clamped between the wall of the cut out of the second closing unit and the sliding unit.

At one end of the second closing unit of the further closing device according to embodiments of the system described herein there is located an end cap. The end cap may have a cavity, which forms the cut out. A wall of the end cap encircling the cavity forms the wall of the cut out. The end cap may comprise the opening.

The further closing device according to embodiments of the system described herein has the advantage that it may ensure a releasing of the first part from the second part under full loading, owing to its particular configuration, especially owing to the use of the engaging part of the first closing unit and the sliding unit of the second closing unit. In addition, a secure holding of the engaging part of the first closing unit in the cut out of the second closing unit may be assured owing to the sliding unit, especially owing to a form fitting connection of the sliding unit to the engaging part of the first closing unit and especially owing to a form fitting connection of the engaging part to the wall of the cut out. Moreover, a movement of the first part relative to the second part may be possible in the closed position of the further closing device according to embodiments of the system described herein. For example, the engaging part may be turned by up to 360° about a first axis of rotation. In addition or alternatively, the engaging part may swivel by as much as 45° about a second axis of rotation, the first axis of rotation being oriented perpendicular to the second axis of rotation. Owing to the configuration with the end cap, the further closing device according to embodiments of the system described herein may be especially easy to assemble, since the assembly may be done by simply fitting together the individual components.

In one embodiment of the further closing device according to embodiments of the system described herein, the end cap may comprise at least one web, which may protrude into the second closing unit and forms the wall encircling the cavity.

In another embodiment of the further closing device according to embodiments of the system described herein, the engaging part of the first closing unit is magnetic. For example, the engaging part may be ferromagnetic. In particular, the engaging part may be made of iron. Moreover, a magnetic unit may be arranged in the cut out of the second closing unit, which may interact with the magnetically formed engaging part of the first closing unit.

It is explicitly pointed out that the system described herein also encompasses embodiments in which the engaging part and/or a unit of the second closing unit which interacts with the engaging part is/are not magnetic.

In yet another embodiment of the further closing device according to embodiments of the system described herein, the engaging part and/or the magnetic unit is/are formed as permanent magnets. For example, the engaging part and/or the magnetic unit may be formed from a magnet made at least partly of neodymium. However, the system described herein is not limited to the aforementioned material as regards a magnet. Instead, any given magnetic materials which are suitable for embodiments of the system described herein may be used for the further closing device according to embodiments of the system described herein.

In yet another embodiment of the further closing device according to embodiments of the system described herein, the magnetic unit delimits the cut out of the second closing unit and the engaging part of the first closing unit is arranged on the magnetic unit especially in the closed position of the sliding unit. For example, the engaging part in the closed position of the sliding unit may lie against the magnetic unit. This embodiment of the system described herein may ensure an especially good holding of the engaging part of the first closing unit in the cut out of the second closing unit, especially in the closed position of the sliding unit.

In one embodiment of the further closing device according to embodiments of the system described herein, the magnetic unit has a first outer side and a second outer side. The first outer side may be oriented toward the opening of the cut out of the second closing unit. On the other hand, the second outer side may be situated opposite to the first outer side. In particular, the first outer side and the second outer side of the magnetic unit may be situated at a distance from each other. Moreover, in the closed position of the sliding unit, the sliding unit may be situated on the second outer side and the engaging part on the first outer side. In particular, the engaging part of the first closing unit may lie against the first outer side of the magnetic unit.

In another embodiment of the further closing device according to embodiments of the system described herein, the sliding unit has a prolongation, which extends in the direction of the opening of the cut out of the second closing unit. For example, it may be provided that the prolongation extends along a side surface of the magnetic unit. Moreover, it may be provided for example that the prolongation is formed as a single piece with the sliding unit. In addition or alternatively, it may be provided that the prolongation of the sliding unit is situated on a base part of the sliding unit, the base part being situated on the second outer side of the magnetic unit in the closed position of the sliding unit. The prolongation of the sliding unit may be situated on the base part of the sliding unit such that the prolongation extends from the base part in the direction of the opening of the cut out along a side surface of the magnetic unit. The side surface of the magnetic unit may be oriented, for example, perpendicular or substantially perpendicular to the first outer side and/or to the second outer side of the magnetic unit. The prolongation of the sliding unit may be provided in particular to lie against the engaging part of the first closing unit in the closed position of the sliding unit, so that the engaging part of the first closing unit may be held clamped between the wall of the cut out of the second closing unit and the prolongation of the sliding unit.

In one embodiment of the further closing device according to embodiments of the system described herein, the second closing unit may comprise at least one spring element. The spring element may be provided with a first end and a second end. The first end of the spring element may be braced against the sliding unit. On the other hand, the second end of the spring element may be braced against a support wall of the second closing unit. This embodiment of the further closing device according to embodiments of the system described herein may ensure with simple and economical means an especially good preloading of the sliding unit in the direction of the opening of the cut out. For example, the spring element may be formed as a helical spring. However, the system described herein is not limited to the use of a helical spring. Instead, any manner of spring and any manner of spring material which is suited to embodiments of the system described herein may be used as the spring element.

In one embodiment of the further closing device according to embodiments of the system described herein, the extension of the cut out of the second closing unit may be larger than the extension of the opening of the second closing unit. The extension of the cut out may be dictated by the distance between two opposite points of the wall of the cut out, where the distance is the length of a straight line oriented perpendicular to a longitudinal axis, the longitudinal axis running through the cut out and through the opening of the second closing unit. Moreover, the extension of the opening may be dictated by the distance of two opposite points of the boundary of the opening, where the distance is the length of a straight line oriented perpendicular to a longitudinal axis, the longitudinal axis running through the cut out and through the opening of the second closing unit. For example, the opening of the cut out may be circular and/or cylindrical. In addition or alternatively, the cut out is cylindrical. If the cross section of the cut out and the cross section of the opening are circular, the diameter of the cut out may be larger than the diameter of the opening. The diameter of the cut out may be decreased in the closed position of the sliding unit, so that the diameter of the cut out is less than the extension of the engaging part. The engaging part then may be held securely in the cut out of the second closing unit.

In one embodiment of the further closing device according to embodiments of the system described herein, the engaging part of the first closing unit has a radius on an outer contour of the engaging part. For example, it may be provided that the engaging part of the first closing unit is rod shaped and/or spherical. For example, it may be provided that, in the closed position of the sliding unit, the spherical engaging part is held in the cut out in rotatable manner.

As already stated above, in one embodiment of the further closing device according to embodiments of the system described herein, the engaging part is made of iron.

In one embodiment of the further closing device according to embodiments of the system described herein, the engaging part has a first beveled surface, a protrusion of the end cap protruding into the cut out having a second beveled surface, the first beveled surface interacting with the second beveled surface only in the closed position of the sliding unit.

BRIEF DESCRIPTION OF THE DRAWINGS

Further practical embodiments and advantages of the system described herein are described in the following in connection with the drawings. There are shown:

FIG. 2 is a cross sectional view of the closing device of FIG. 1, according to embodiments of the system described herein;

FIG. 3 is a schematic representation of the second closing unit of the closing device of FIG. 1, according to embodiments of the system described herein;

FIG. 4 is a first side view of the second closing unit of FIG. 3, according to embodiments of the system described herein;

FIG. 5 is a second side view of the second closing unit, rotated by 90° to the first side view of FIG. 4, according to embodiments of the system described herein;

FIG. 6 is a third side view of the second closing unit, rotated by 90° to the first side view of FIG. 4, according to embodiments of the system described herein;

FIG. 7 is a schematic representation of a base unit of a second closing unit of a further closing device, according to embodiments of the system described herein;

FIG. 8 is a schematic representation of the base unit of the second closing unit of the further closing device of FIG. 7 and an engaging part of a first closing unit, according to embodiments of the system described herein;

FIG. 9 is a side view of the base unit of the second closing unit of the further closing device of FIG. 7, according to embodiments of the system described herein;

FIG. 10 is a further schematic representation of the base unit of the second closing unit of the further closing device of FIG. 7, according to embodiments of the system described herein;

DESCRIPTION OF VARIOUS EMBODIMENTS

Figure 1:
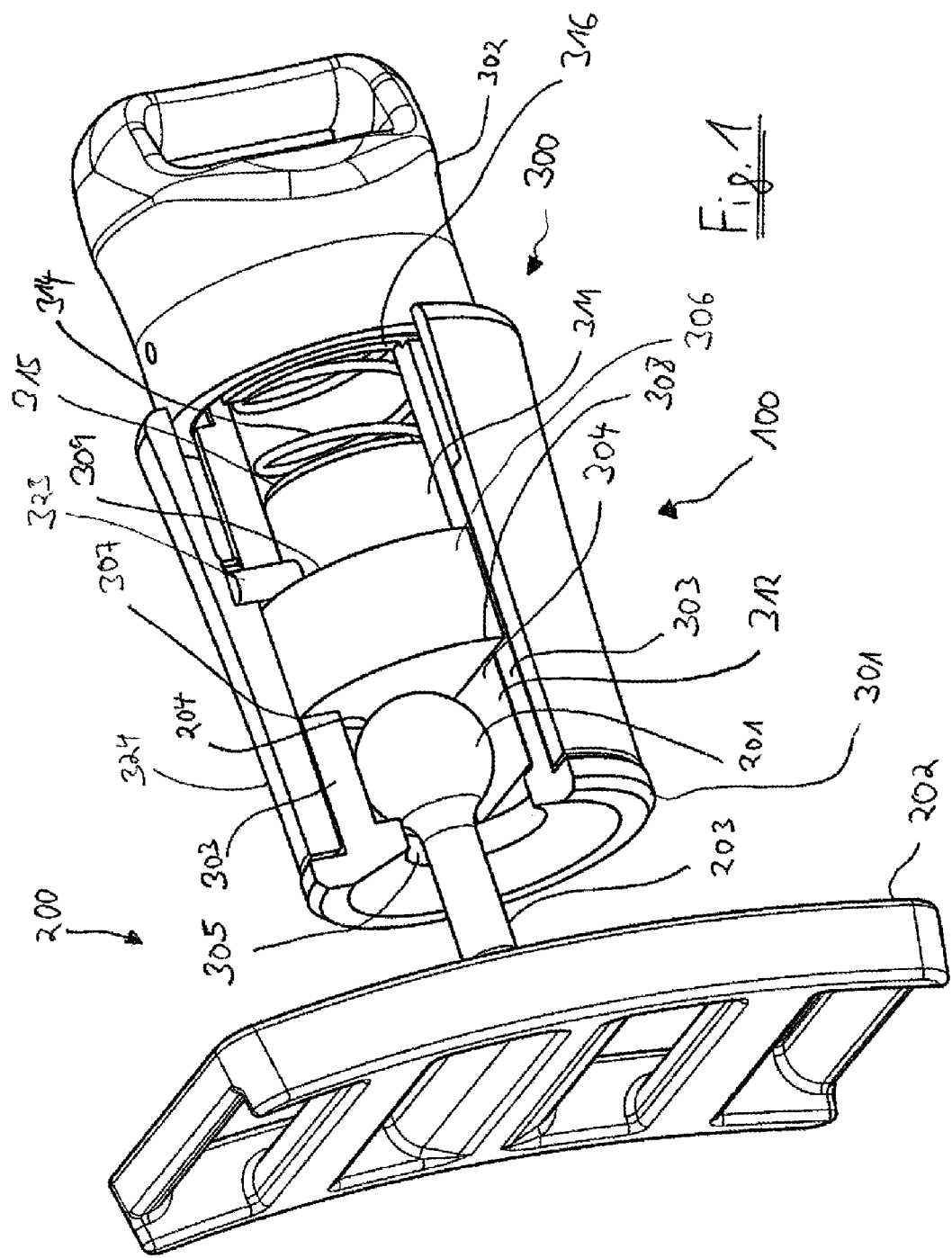
FIG. 1 is a schematic representation of a closing device with a first closing unit and with a second closing unit, according to embodiments of the system described herein.

FIG. 1 shows a schematic representation of one embodiment of the closing device 100 according to embodiments of the system described herein having a first closing unit 200 and a second closing unit 300, where parts of the units yet to be explained in the following are not represented in FIG. 1, in order to better reveal the arrangement of the individual units in the closing device 100 as well as the method of functioning of the individual units. FIG. 2 shows a cross sectional view of the closing device 100 of FIG. 1. In the following, FIGS. 1 and 2 shall first be discussed.

The first closing unit 200 may comprise a spherical engaging part 201 and a first retaining device 202 arranged on the spherical engaging part 201. Moreover, the first retaining device 202 may be provided with a cylindrical rod 203, which may be arranged on the spherical engaging part 201. The first retaining device 202 may serve for the mounting of a first part, which may be being releasably connected to a second part. For example, a strap and/or a carabiner hook may be mounted on the first retaining device 202. However, the system described herein is not limited to such a first part. Instead, any desired first part which is releasably connected to the second part may be mounted on the first retaining device 202.

The spherical engaging part 201 may have a spherical head 204, which may be formed for example partly or entirely as a permanent magnet. For example, the spherical head 204 may be formed from a magnet made at least partly of neodymium. However, the system described herein is not limited to the aforementioned material as regards a magnet. Instead, any given magnetic materials which are suitable for embodiments of the system described herein may be used for the closing device according to embodiments of the system described herein. In another embodiment, the spherical head 204 is made of iron, which is ferromagnetic.

Moreover, the closing device 100 according to embodiments of the system described herein may comprise the second closing unit 300, which may be provided with a base unit 301 as well as a second retaining device 302 arranged on the base unit 301. For example, the second retaining device 302 may be screwed onto the base unit 301. Alternatively, the second retaining device 302 may be screwed into the base unit 301, for example.

The base unit 301 of the second closing unit 300 in the embodiment of the closing device 100 according to embodiments of the system described herein that is depicted here is sleeve shaped. However, the system described herein is not limited to the aforementioned configuration of the base unit 301. Instead, the base unit 301 may have any desired configuration which is suited to the invention, such as a cylindrical configuration, a cuboidal configuration, and/or also a spherical configuration.

The second retaining device 302 may be shaped as a loop and may serve for the mounting of the second part, which may be connected releasably to the first part. For example, a strap and/or a carabiner hook may be mounted on the second retaining device 302. However, the system described herein is not limited to such a second part. Instead, any desired second part which is releasably connected to the first part may be mounted on the second retaining device 302.

The base unit 301 of the second closing unit 300 may comprise a wall 303, delimiting a cut out 304 to receive the spherical engaging part 201 of the first closing unit 200. The cut out 304 of the base unit 301 may be basically arranged in an inner space of the sleeve-shaped base unit 301. Moreover, the cut out 304 of the base unit 301 may have an opening 305. The spherical engaging part 201 may be held in the cut out 304 of the base unit 301 in a closed position of the closing device 100 for the closure of the closing device 100.

Moreover, a magnetic unit 306 may be arranged in and on the cut out 304 of the base unit 301. For this, the base unit 301 may have a wall cut out 307, in which the magnetic unit 306 may be held clamped and from which the magnetic unit 306 may protrude into the cut out 304 of the base unit 301. The wall cut out 307 in this embodiment may be fashioned as a slot, in which the magnetic unit 306 is situated with force locking and form fitting. Accordingly, the wall cut out 307 may be adapted as a holder for the magnetic unit 306. The magnetic unit 306 in this embodiment may delimit the cut out 304. For example, the magnetic unit 306 may be a permanent magnet. In particular, the magnetic unit 306 may be formed from a magnet made at least partly of neodymium. However, the system described herein is not limited to the aforementioned material as regards a magnet. Instead, any given magnetic materials which are suitable for the invention may be used for the closing device 100 according to embodiments of the system described herein.

The magnetic unit 306 may comprise a first outer side 308 and a second outer side 309. The first outer side 308 may be oriented toward the opening 305 of the cut out 304 of the base unit 301. On the other hand, the second outer side 309 may be situated opposite to the first outer side 308. In the embodiment depicted here, the first outer side 308 and the second outer side 309 of the magnetic unit 306 may be situated at a distance from each other. On the second outer side 309 there may be arranged a base part 310 of a sliding unit 311. The sliding unit 311 may comprise a prolongation 312, which extends along a side surface 313 of the magnetic unit 306 in the direction of the opening 305 of the cut out 304. The prolongation 312 of the sliding unit 311 may be arranged on the base part 310 of the sliding unit 311. For example, it may be formed as a single piece on the base part 310. The side surface 313 of the magnetic unit 306 may be oriented, for example, perpendicular or substantially perpendicular to the first outer side 308 and to the second outer side 309 of the magnetic unit 306. The extension of the magnetic unit 306 along a straight line oriented perpendicular to a longitudinal axis in the form of an axis of rotation 318 of the base unit 301 may be chosen such that the magnetic unit 306 does not extend along this line along the entire extension of the cut out 304, but may be only situated in the cut out 304 such that the prolongation 312 of the sliding unit 311 along the side surface 313 of the magnetic unit 306 extends into the cut out 304 of the base unit 301.

The sliding unit 311 may be preloaded in the direction of the opening 305 of the cut out 304. For this, the second closing unit 300 may comprise a spring element 314. The spring element 314 may be provided with a first end 315 and a second end 316. The first end 315 of the spring element 314 may be braced against the sliding unit 311. On the other hand, the second end 316 of the spring element 314 may be braced against a support wall 317 of the second retaining device 302. The spring element 314 may be formed as a helical spring, for example. However, the system described herein is not limited to the use of a helical spring. Instead, any manner of spring and any manner of spring material which is suited to embodiments of the system described herein may be used as the spring element 314.

Owing to the spring tension provided by the spring element 314, the sliding unit 311 may be moved along the wall 303 of the base unit 301, which also may be the wall 303 of the cut out 304, into an open position and a closed position in the cut out 304. In other words, the sliding unit 311 may be moved into two positions, namely a first position in the form of an open position, and a second position in the form of a closed position, the sliding unit 311 being guided along the wall 303 of the cut out 304.

In the embodiment of the closing device 100 of embodiments of the system described herein which is depicted here, the extension D1 of the cut out 304 may be larger than the extension D2 of the opening 305 of the base unit 301. The extension D1 of the cut out 304 may be dictated by the distance between two opposite points of the wall 303, where the distance is the length of a straight line oriented perpendicular to a longitudinal axis of the base unit 301. For example, the longitudinal axis may be the axis of rotation 318 of the base unit 301. The longitudinal axis may run through the cut out 304 and through the opening 305. As is evident from FIG. 2, the extension D1 of the cut out 304 may be determined without accounting for the prolongation 312 of the sliding unit 311. The extension D2 of the opening 305 may be dictated by the distance of two opposite points of the boundary of the opening 305, where the distance is the length of a straight line oriented perpendicular to the longitudinal axis, here as well the longitudinal axis being for example the axis of rotation 318. In particular, the opening 305 may be circular and/or cylindrical. The cut out 304 may be cylindrical. If, as in the embodiment depicted in FIG. 2, both the opening 305 and the cut out 304 are circular in cross section, then the extension D1 of the cut out 304 in this embodiment corresponds to a first diameter and the extension D2 of the opening 305 corresponds to a second diameter. The first diameter of the cut out 304 may be larger than the second diameter of the opening 305.

As explained above, the sliding unit 311 may be moved into two positions, namely a first position in the form of an open position, and a second position in the form of a closed position. In order to move the sliding unit 311 into the open position, the spherical engaging part 201 of the first closing unit 200 may be placed at the opening 305 of the cut out 304. Owing to the magnetic force of attraction acting between the spherical engaging part 201 and the magnetic unit 306, the spherical engaging part 201 may be pulled through the opening 305 of the cut out 304 in the direction of the magnetic unit 306. In this process, the spherical engaging part 201 may move the prolongation 312 of the sliding unit 311 out from the cut out 304. In other words, the spherical engaging part 201 may move the sliding unit 311 in the direction of the second retaining device 302. The sliding unit 311 at the end of this movement finds itself in the open position. In the open position of the sliding unit 311, the spherical engaging part 201 may be inserted into and received in the cut out 304 of the base unit 301.

Once the spherical engaging part 201 has been received in the cut out 304 of the base unit 301, the prolongation 312 of the sliding unit 311 may be moved on account of the preloading of the sliding unit 311 in the direction of the opening 305 of the cut out 304. In this process, the prolongation 312 of the sliding unit 311 may move the spherical engaging part 201 in the direction of the wall 303 situated opposite the prolongation 312 of the sliding unit 311, such that the spherical engaging part 201 is situated between the wall 303 and the prolongation 312 of the sliding unit 311. This may be the closed position of the sliding unit 311. In the closed position of the sliding unit 311, the prolongation 312 of the sliding unit 311 may limit the extension D1 of the cut out 304. Moreover, in the closed position of the sliding unit 311, the spherical engaging part 201 of the first closing unit 200 may lie against both the wall 303 of the cut out 304 of the base unit 301 of the second closing unit 300 and against the sliding unit 311. The spherical engaging part 201 then may be held clamped between the wall 303 of the cut out 304 and the prolongation 312 of the sliding unit 311. Moreover, the spherical engaging part 201 then may lie against the first outer side 308 of the magnetic unit 306. The prolongation 312 of the sliding unit 311 partly closes the opening 305 such that the spherical engaging part 201 may not emerge from the opening 305 in the closed position of the sliding unit 311.

In the closed position of the sliding unit 311, the spherical engaging part 201 and accordingly the first closing unit 200 may be held rotatably in the cut out 304 of the base unit 301. In particular, in this embodiment of the closing device 100 according to embodiments of the system described herein, the spherical engaging part 201 of the first closing unit 200 may have a longitudinal axis 205 extending in the direction of the first retaining device 202 and along the cylindrical rod 203. For example, the spherical engaging part 201 may turn about this longitudinal axis 205 by as much as 360°. Hence, an especially good movement of the first closing unit 200 relative to the second closing unit 300, and thus also an especially good movement of the first part relative to the second part, may be assured, the first part being releasably connected to the second part via the closing device 100.

The spherical engaging part 201 and thus also the first closing unit 200 may be furthermore held in the cut out 304 in rotatable manner, especially rotatably along an envelope surface of a cone, where a rotational axis 206 of the spherical engaging part 201 may run through the apex of the cone, and the apex of the cone may be situated at the midpoint of the spherical engaging part 201. The rotational axis 206 likewise may run through the midpoint of the spherical engaging part 201 and may be furthermore oriented perpendicular to the longitudinal axis 205. For example, the half aperture angle of the cone may be as much as 45°. In other words, the spherical engaging part 201 and thus also the first closing unit 200 may be swiveled by an angle of as much as 45°. Moreover, the spherical engaging part 201 and thus also the first closing unit 200 may be moved along the envelope surface of the cone and within the region of the cone which is enclosed by the envelope surface.

In the following, FIGS. 3 to 6 shall be discussed more closely. FIG. 3 shows a schematic representation of the second closing unit 300. More precisely, FIG. 3 shows a schematic representation of the base unit 301 of the second closing unit 300. FIG. 4 shows a first side view of the base unit 301 of FIG. 3. FIG. 5 shows a second side view of the base unit 301, rotated by 90° to the first side view of FIG. 4. FIG. 6 shows a schematic representation of a third side view of the base unit 301, rotated by 90° to the first side view of FIG. 4.

As already explained above, the base unit 301 may be sleeve shaped. The base unit 301 may comprise an inner space 321 enclosed by the wall 303. The cut out 304 may be arranged in the inner space 321 in the area of a first end 319 of the base unit 301. Moreover, the opening 305 of the cut out 304 may be situated at the first end 319 of the base unit 301. The opening 305 may be slightly beveled at its edges, so that the spherical engaging part 201 may be easily inserted through the opening 305 into the cut out 304. In addition to the first end 319, the base unit 301 may have a second end 320, at which the second retaining device 302 may be situated (not shown in FIGS. 3 to 5).

As was likewise already explained above, the base unit 301 may comprise the wall cut out 307, in which the magnetic unit 306 may be held clamped and from which the magnetic unit 306 may protrude into the cut out 304 of the base unit 301. The wall cut out 307 in this embodiment may be formed as a slot in which the magnetic unit 306 is arranged with force locking and form fitting. The wall cut out 307 accordingly may be formed as a holder for the magnetic unit 306.

The base unit 301 may comprise slotted guides 322, which extend from the region of the wall cut out 307 in the direction of the second end 320 of the base unit 301. Pins 323 may be led in the slotted guides 322, the pins 323 being arranged on the one hand on the sliding unit 311 and on the other hand on a second activating device 324. The second activating device 324 may be arranged movably on an outer circumference of the base unit 301. More precisely, the second activating device 324 may be moved from a position of rest, which is represented in FIG. 1, to a releasing position in the direction of the second retaining device 302. During the movement of the second activating device 324 in the direction of the second retaining device 302, the sliding unit 311 may be moved in the direction of the second retaining device 302 owing to an interacting of the second activating device 324 with the sliding unit 311 by virtue of the pins 323. In this way, the prolongation 312 of the sliding unit 311 may be released from the spherical engaging part 201 and moved out from the cut out 304 such that the spherical engaging part 201 is released and guided out from the cut out 304 through the opening 305. In this way, the first closing unit 200 and the first part situated therein may be separated once again and released from the second closing unit 300 and the second part situated thereon. This embodiment of the closing device 100 according to embodiments of the system described herein may ensure an especially easy releasing of the first part from the second part by operating the second activating device 324, especially under full loading.

In the embodiment of the closing device 100 according to embodiments of the system described herein which is represented in FIGS. 1 to 6, the sliding unit 311 may be arranged on a first activating device 325 (see FIG. 2). For example, the first activating device 325 may be fastened on the sliding unit 311 and may be led out through openings on the support wall 317 and the second retaining device 302 from the closing device 100. For example, the first activating device 325 may be formed as a Bowden cable. This embodiment of the closing device 100 according to embodiments of the system described herein may ensure an especially easy releasing of the first part from the second part by operating the first activating device 325, especially under full loading.

The closing device 100 according to embodiments of the system described herein has the advantage that it may ensure a releasing of the first part from the second part under full loading, owing to its particular configuration, especially owing to the use of the spherical engaging part 201 of the first closing unit 200. In addition, a secure holding of the spherical engaging part 201 of the first closing unit 200 in the cut out 304 of the second closing unit 300 may be assured owing to the sliding unit 311, especially owing to a form fitting connection of the sliding unit 311 to the spherical engaging part 201 of the first closing unit 200 and especially owing to a form fitting connection of the spherical engaging part 201 to the wall 303 of the cut out 304. Moreover, a movement of the first part relative to the second part may be possible in the closed position of the closing device 100 according to embodiments of the system described herein.

The closing device 100 according to embodiments of the system described herein may be used in many areas of everyday life. When an object, such as an accessory, a piece of equipment, and/or a tool is/are not intended to be permanently secured to a person and/or to another object, a simple and reliable as well as releasable securing of the object to the person and/or to the other object may be provided by the closing device 100 according to embodiments of the system described herein. For example, the closing device 100 according to embodiments of the system described herein may serve for the releasable fastening of equipment items on, for example, a bicycle, a wheelchair or a baby carriage. The closing device 100 according to embodiments of the system described herein also may be used for dog leashes, for the rigging of sailboats, for the fastening of sails in surfing or flying kites, for the securing of objects when diving, for the securing of objects when hunting, for the securing of equipment items in the military, for horse riding, for hiking, for parachute jumping, and/or in general for aviation and space travel. Moreover, the closing device 100 according to embodiments of the system described herein also may be suited to the releasable fastening of tools, for example on carrying vests. The closing device 100 according to embodiments of the system described herein also may be used in construction for the releasable securing of ropes for the guiding of building parts. The aforementioned listing of possible uses of the closing device 100 according to embodiments of the system described herein is not to be understood as definitive, but rather it is only an example. Accordingly, the closing device 100 according to embodiments of the system described herein may be used for any application to which the closing device 100 according to embodiments of the system described herein is suited, especially in the areas of sports, seafaring, the animal world, and industry.

Figure 13:
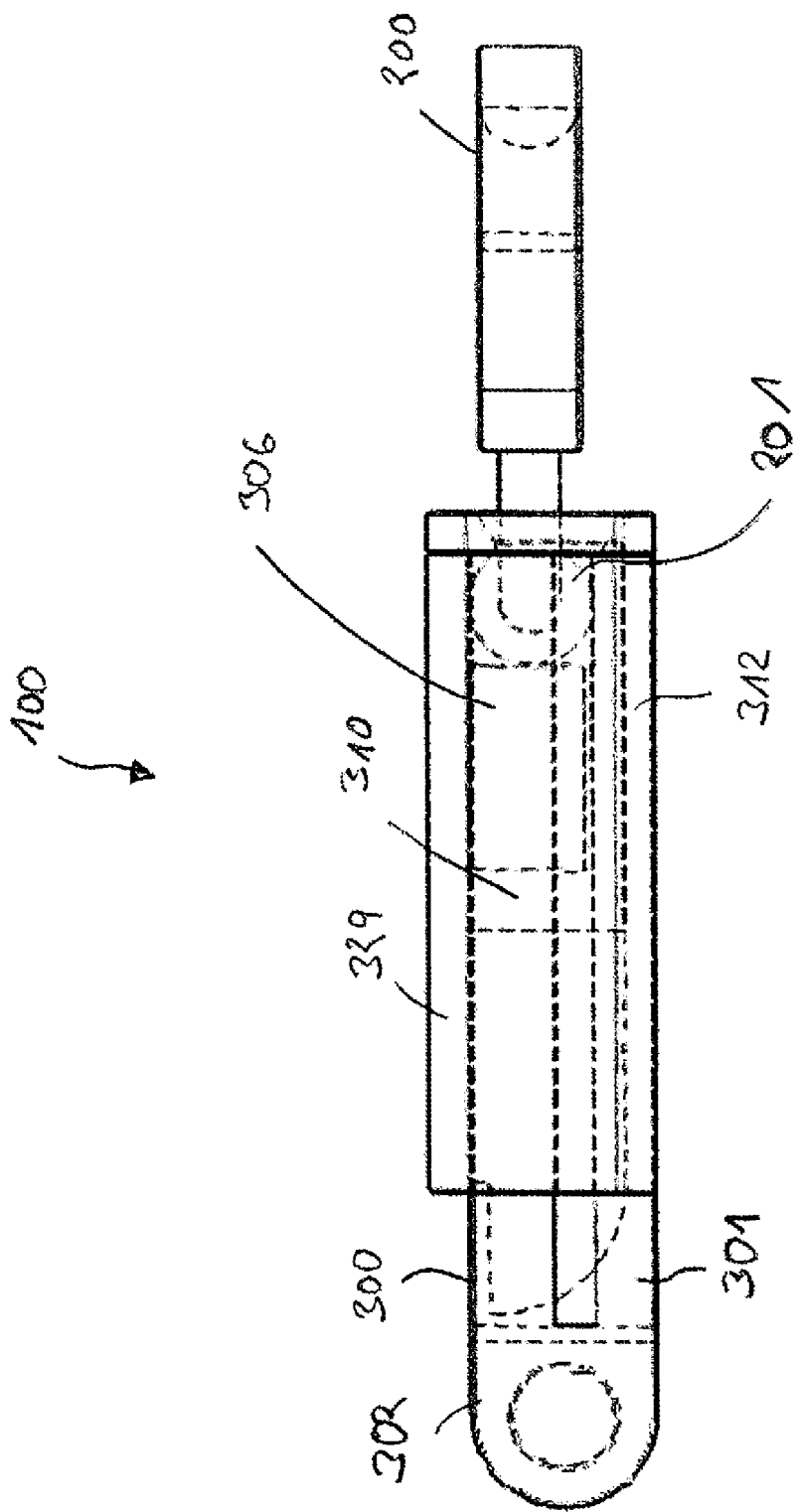
FIG. 13 is a schematic side view of the further closing device, where the components which are received in a cut out are represented by broken lines.

FIG. 7 shows a schematic representation of one embodiment of a second closing unit 300 of a further closing device 100 according to embodiments of the system described herein. The second closing unit 300 of the further closing device 100 according to embodiments of the system described herein may be provided with a base unit 301 (see FIGS. 7, 9, 10 and 13) and with a second retaining device 302 arranged on the base unit 301 (see FIG. 13).

The base unit 301 of the second closing unit 300 is rectangular in the embodiment represented here of the further closing device 100 according to embodiments of the system described herein. However, the system described herein is not limited to the aforementioned configuration of the base unit 301. Instead, the base unit 301 may have any desired configuration which is suited to embodiments of the system described herein, such as a cylindrical configuration, a cuboidal configuration, and/or also a spherical configuration.

The second retaining device 302 may be shaped as a loop, for example, and may serve for the mounting of the second part, which may be connected releasably to the first part. For example, a strap and/or a carabiner hook may be mounted on the second retaining device 302. However, the system described herein is not limited to such a second part. Instead, any desired second part which is releasably connected to the first part may be mounted on the second retaining device 302.

The base unit 301 of the second closing unit 300 of the further closing device 100 according to embodiments of the system described herein comprises a wall 303, delimiting a cut out 304 to receive an engaging part 201 (not shown in FIG. 7) of the first closing unit 200. The cut out 304 of the base unit 301 basically may be arranged in an inner space of the base unit 301. Moreover, the cut out 304 of the base unit 301 may have an opening 305 (see FIGS. 7, 9 and 10). The engaging part 201 may be held in the cut out 304 of the base unit 301 in a closed position of the further closing device 100 according to embodiments of the system described herein for the closure of the further closing device 100 according to embodiments of the system described herein.

The engaging part 201 may be provided with a radius, for example. In particular, the engaging part 201 may be spherical. In one embodiment, the engaging part has at least one spherical head or at least two spherical heads. In a further embodiment, the engaging part 201 may be rod shaped (see FIG. 8). The engaging part 201 of the further closing device 100 according to embodiments of the system described herein may be formed, for example, partly or entirely as a permanent magnet. For example, the engaging part 201 may be formed at least partly from a magnet made at least partly of neodymium. However, the system described herein is not limited to the aforementioned material as regards a magnet. Instead, any given magnetic materials which are suitable for embodiments of the system described herein may be used for the further closing device 100 according to embodiments of the system described herein. In a further embodiment, the engaging part 201 is made of iron which is ferromagnetic.

Moreover, a magnetic unit 306 (see FIGS. 9 and 13) may be arranged in and on the cut out 304 of the base unit 301. For this, the base unit 301 may have a wall cut out 307, in which the magnetic unit 306 may be held clamped and from which the magnetic unit 306 may protrude into the cut out 304 of the base unit 301 (see FIG. 10). The wall cut out 307 in this embodiment may be fashioned as a slot, in which the magnetic unit 306 may be situated with force locking and form fitting. Accordingly, the wall cut out 307 may be adapted as a holder for the magnetic unit 306. The magnetic unit 306 in this embodiment may delimit the cut out 304. For example, the magnetic unit 306 may be formed as a permanent magnet. In particular, the magnetic unit 306 may be formed from a magnet which is made at least partly of neodymium. However, the system described herein is not limited to the aforementioned material as regards a magnet. Instead, any given magnetic materials which are suitable for embodiments of the system described herein may be used for the further closing device 100 according to embodiments of the system described herein.

Figure 12:
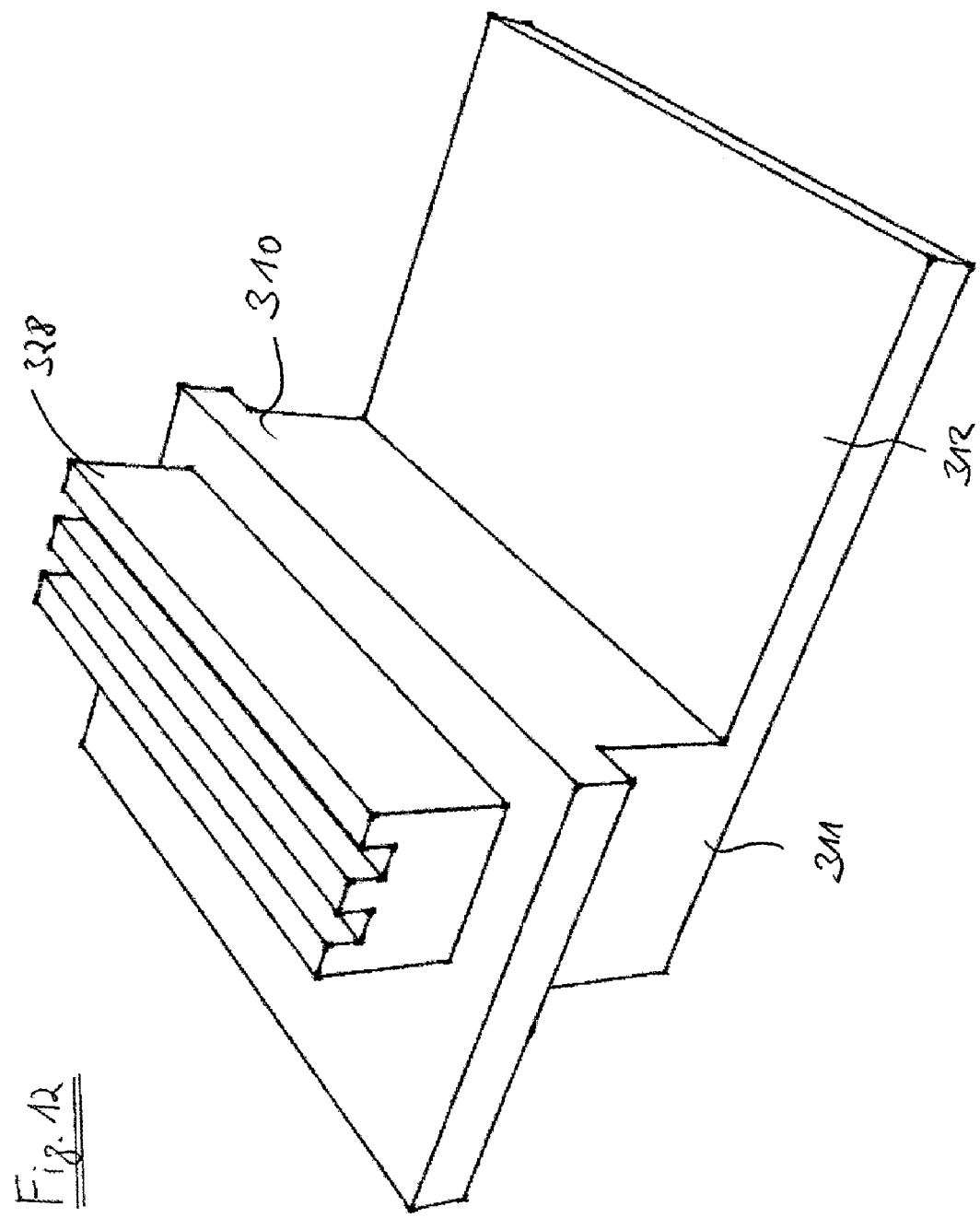
FIG. 12 is a schematic representation of a sliding unit of the further closing device of FIG. 7, according to embodiments of the system described herein.

The magnetic unit 306 of the further closing device 100 according to embodiments of the system described herein comprises a first outer side and a second outer side. The first outer side may be oriented toward the opening 305 of the cut out 304 of the base unit 301. On the other hand, the second outer side may be situated opposite to the first outer side. In the embodiment depicted here, the first outer side and the second outer side of the magnetic unit 306 are situated at a distance from each other. On the second outer side there may be arranged a base part 310 of a sliding unit 311 (see FIGS. 12 and 13). The sliding unit 311 may comprise a prolongation 312, which extends along a side surface of the magnetic unit 306 in the direction of the opening 305 of the cut out 304 (see FIGS. 12 and 13). The prolongation 312 of the sliding unit 311 may be arranged on the base part 310 of the sliding unit 311, for example, it may be formed as a single piece on the base part 310. The side surface of the magnetic unit 306 may be oriented for example perpendicular or substantially perpendicular to the first outer side and to the second outer side of the magnetic unit 306. The extension of the magnetic unit 306 along a straight line oriented perpendicular to a longitudinal axis in the form of an axis of symmetry of the base unit 301 may be chosen such that the magnetic unit 306 does not extend along this line along the entire extension of the cut out 304, but may be only situated in the cut out 304 such that the prolongation 312 of the sliding unit 311 along the side surface of the magnetic unit 306 extends into the cut out 304 of the base unit 301.

Figure 11:
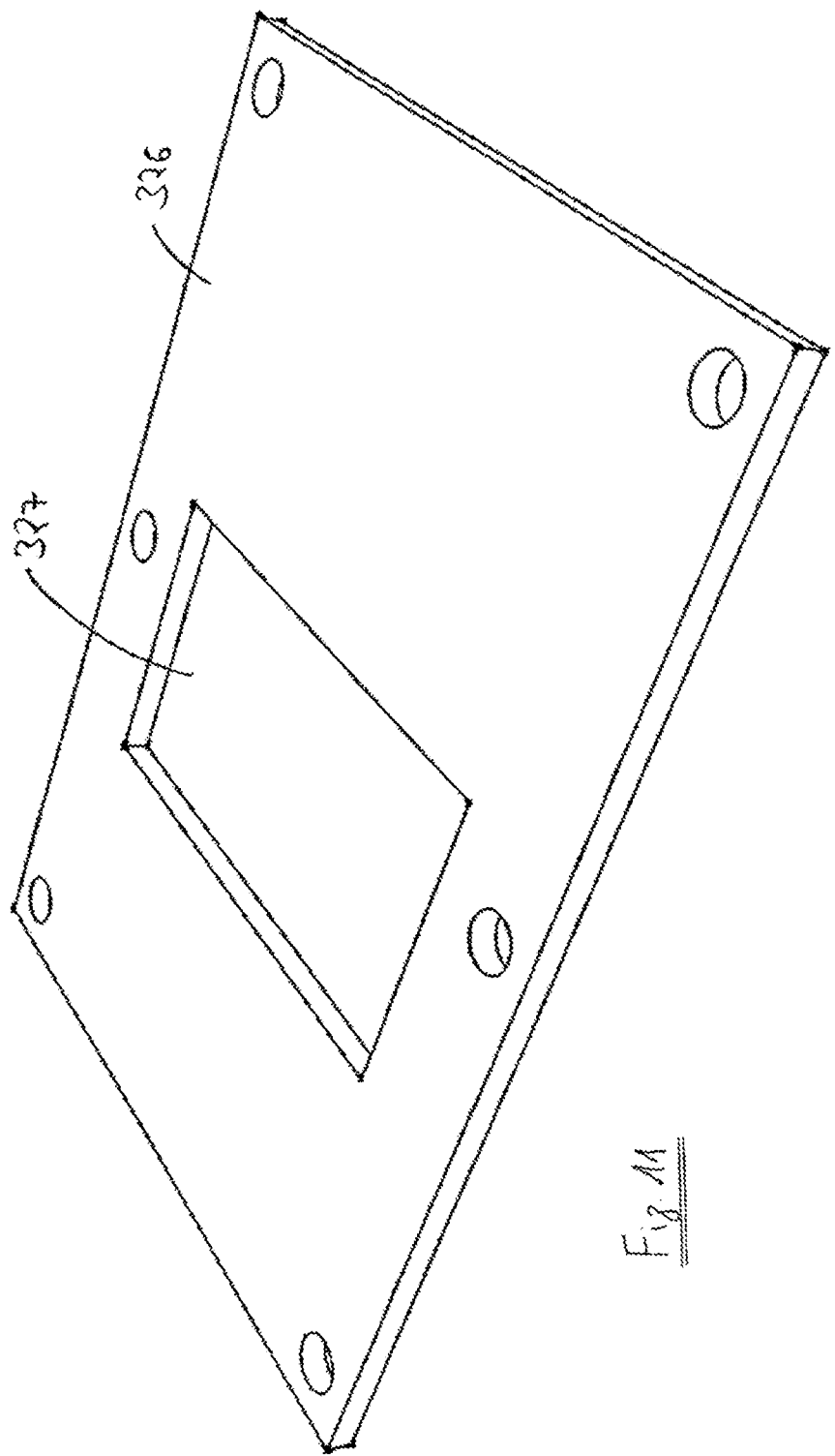
FIG. 11 is a schematic representation of a cover unit of the base unit of the second closing unit of the further closing device of FIG. 7, according to embodiments of the system described herein.

The base unit 301 may comprise a cover unit 326 (see in particular FIGS. 7 and 11). The cover unit 326 may be part of the wall 303 of the cut out 304 and it may have an opening 327 through which a guiding device 328 of the sliding unit 311 extends.

The sliding unit 311 may be preloaded in the direction of the opening 305 of the cut out 304. For this, the second closing unit 300 may comprise a spring element (not shown). The spring element may be provided with a first end and a second end. The first end of the spring element may be braced against the sliding unit 311. On the other hand, the second end of the spring element may be braced against a support wall of the base unit 301. For example, the spring element may be formed as a helical spring. However, the system described herein is not limited to the use of a helical spring. Instead, any manner of spring and any manner of spring material which is suited to embodiments of the system described herein may be used as the spring element.

Owing to the spring tension provided by the spring element, the sliding unit 311 may be moved along the wall 303 of the base unit 301, which also may be the wall 303 of the cut out 304, into an open position and a closed position in the cut out 304. In other words, the sliding unit 311 may be moved into two positions, namely a first position in the form of an open position, and a second position in the form of a closed position, the sliding unit 311 being guided along the wall 303 of the cut out 304.

As explained above, the sliding unit 311 may be moved into two positions, namely a first position in the form of an open position, and a second position in the form of a closed position. In order to move the sliding unit 311 into the open position, the engaging part 201, such as the rod shaped engaging part 201, of the first closing unit 200 (see FIG. 8) may be placed at the opening 305 of the cut out 304. Owing to the magnetic force of attraction acting between the engaging part 201 and the magnetic unit 306, the engaging part 201 may be pulled through the opening 305 of the cut out 304 in the direction of the magnetic unit 306. In this process, the engaging part 201 may move the prolongation 312 of the sliding unit 311 out from the cut out 304. In other words, the engaging part 201 may move the sliding unit 311 in a direction opposite to the cut out 304. The sliding unit 311 at the end of this movement finds itself in the open position. In the open position of the sliding unit 311, the engaging part 201 may be inserted into and received in the cut out 304 of the base unit 301.

Once the engaging part 201 has been received in the cut out 304 of the base unit 301, the prolongation 312 of the sliding unit 311 may be moved on account of the preloading of the sliding unit 311 in the direction of the opening 305 of the cut out 304. In this process, the prolongation 312 of the sliding unit 311 may move the engaging part 201 in the direction of the wall of the cut out 304 situated opposite the prolongation 312 of the sliding unit 311, in the form of the wall of the cover unit 326, such that the engaging part 201 may be situated between the wall of the cover unit 326 and the prolongation 312 of the sliding unit 311. This may be the closed position of the sliding unit 311. In the closed position of the sliding unit 311, the prolongation 312 of the sliding unit 311 may limit the extension of the cut out 304. Moreover, in the closed position of the sliding unit 311 the engaging part 201 of the first closing unit 200 may lie against both the wall of the cover unit 326 and against the sliding unit 311. The engaging part 201 then may be held clamped between the wall of the cover unit 326 and the prolongation 312 of the sliding unit 311. Moreover, the engaging part 201 then may lie against the first outer side of the magnetic unit 306. The prolongation 312 of the sliding unit 311 partly closes the opening 305 such that the engaging part 201 may not emerge from the opening 305 in the closed position of the sliding unit 311.

In the closed position of the sliding unit 311, the engaging part 201 and accordingly the first closing unit 200 may be held in the cut out 304 of the base unit 301.

In order to open the further closing device 100 according to embodiments of the system described herein, the sliding unit 311 may be moved into the open position by means of the guiding device 328, on which a sliding device 329 may be arranged. In other words, the sliding device 329 may be operated by pushing, for example, so that the guiding device 328 may move the sliding unit 311. The sliding device 329 may be arranged for example on an outer side of the base unit 301. The engaging part 201 then may be removed once again from the cut out 304 through the opening 305, since little or no clamping force may be acting on the engaging part 201.

Figure 14:
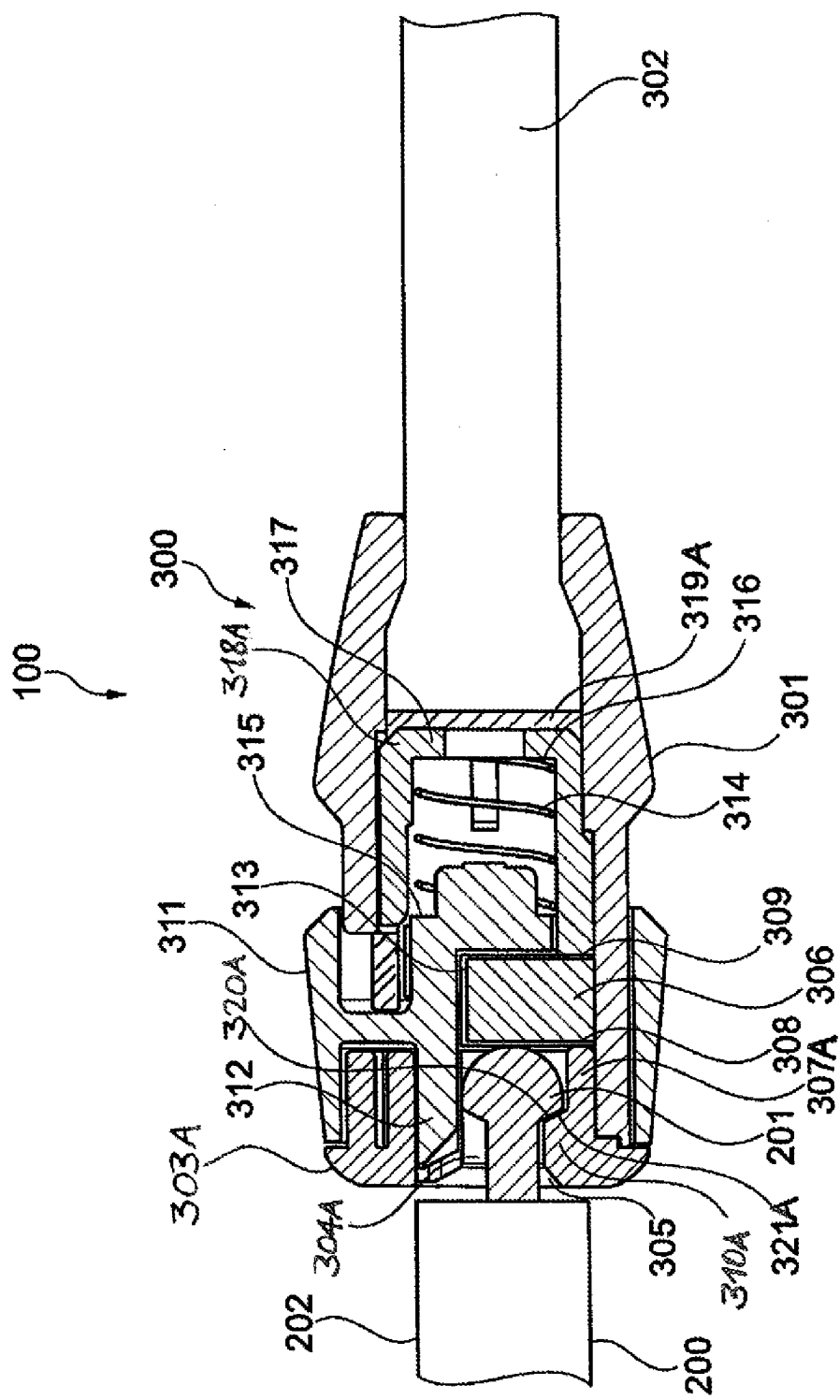
FIG. 14 is a schematic representation of a further closing device with a first closing unit and with a second closing unit, according to embodiments of the system described herein.

FIG. 14 shows yet another embodiment of the closing device 100 according to embodiments of the system described herein. The closing device 100 may comprise a first closing unit 200, the first closing unit 200 having an engaging part 201 and a first retaining device 202 arranged on the engaging part 201 for the mounting of the first part. In other words, the first part, which may be releasably connected to the second part, may be mounted on the first retaining device 202. The engaging part 201 may have a spherical head, for example, on which the first retaining device 202 may be arranged. For example, the first retaining device 202 may be at least partly rod shaped.

Moreover, the closing device 100 may comprise a second closing unit 300, having a base unit 301. On the base unit 301 there may be arranged a second retaining device 302 for the mounting of the second part. Furthermore, at one end of the base unit 301 there may be arranged an end cap 303A. The end cap 303A may have a cavity 304A, forming a cut out.

The end cap 303A may comprise a substantially encircling web 307A, which may protrude into the base unit 301 of the second closing unit 300 and which forms the wall encircling the cavity 304A. The wall encircling the cavity 304A may form the wall of the cut out. The cavity 304A in the form of the cut out may serve for receiving the engaging part 201 of the first closing unit 200.

The end cap 303A also may have an opening 305. The opening 305 may serve for introducing the engaging part 201 of the first closing unit 200, the engaging part 201 of the first closing unit 200 being held in a closed position of the closing device 100 in the cavity 304A in the form of the cut out of the second closing unit 300 for the closure of the closing device 100.

In the cavity 304A in the form of the cut out of the second closing unit 300 there may be arranged a sliding unit 311. The sliding unit 311 may be preloaded in the direction of the opening 305. For this, the second closing unit 300 may comprise a spring element 314. The spring element 314 may be provided with a first end 315 and a second end 316. The first end 315 of the spring element 314 may be braced against the sliding unit 311. On the other hand, the second end 316 of the spring element 314 may be braced against a support wall 317 of the second closing unit 300. This embodiment of the closing device 100 may ensure with simple and economical means an especially good preloading of the sliding unit 311 in the direction of the opening 305. For example, the spring element 314 may be formed as a helical spring. However, the system described herein is not limited to the use of a helical spring. Instead, any manner of spring and any manner of spring material which is suited to embodiments of the system described herein may be used as the spring element 314.

In a further embodiment, the support wall 317 is not provided by a sleeve 318A forming the support wall 317 and enclosing the spring element 314. Instead, no sleeve 318A is provided. One end 319A of the base unit 301 then forms the support wall 317.

The sliding unit 311 may have a prolongation 312, which extends in the direction of the opening 305 of the cavity 304A in the form of the cut out of the second closing unit 300. The prolongation 312 may extend in particular along a side surface 313 of a magnetic unit 306. The prolongation 312 may be formed as a single piece with the sliding unit 311. The side surface 313 of the magnetic unit 306 may be oriented, for example, perpendicular or substantially perpendicular to the first outer side 308 and/or to the second outer side 309 of the magnetic unit 306.

The sliding unit 311 may be moved into an open position and a closed position in the cut out along the web 307A forming the wall of the cavity 304A in the form of the cut out. In other words, the sliding unit 311 may be moved into two positions, namely a first position in the form of an open position, and a second position in the form of a closed position, the sliding unit 311 being guided for example along the wall of the cut out.

In the open position of the sliding unit 311, the engaging part 201 of the first closing unit 200 may be inserted into and/or received through the opening 305 in the cavity 304A in the form of the cut out of the second closing unit 300. In the closed position of the sliding unit 311, the sliding unit 311 may delimit an extension of the cavity 304A in the form of the cut out of the second closing unit 300. Basically, the sliding unit 311 in the closed position may reduce the extension of the cavity 304A in the form of the cut out such that the extension of the cavity 304A may be smaller than the engaging part 201 arranged in the cavity 304A. Moreover, in the closed position of the sliding unit 311, which is the closed position of the closing device 100, the engaging part 201 of the first closing unit 200 may lie against both the wall of the cavity 304A in the form of the cut out of the second closing unit 300 and against the sliding unit 311. The engaging part 201 then may be held clamped between the wall of the cavity 304A in the form of the cut out of the second closing unit 300 and the sliding unit 311. The prolongation 312 of the sliding unit 311 may be designed to lie against the engaging part 201 of the first closing unit 200 in the closed position of the sliding unit 311, so that the engaging part 201 of the first closing unit 200 may be held clamped between the wall of the cavity 304A in the form of the cut out of the second closing unit 300 and the prolongation 312 of the sliding unit 311.

The engaging part 201 of the first closing unit 200 may be magnetic. For example, the engaging part 201 may be ferromagnetic. In particular, the engaging part 201 may be made of iron. Moreover, the magnetic unit 306, which may interact with the magnetically formed engaging part 201 of the first closing unit 200, may be arranged in the cavity 304A in the form of the cut out or on the cavity 304A in the form of the cut out of the second closing unit 300.

It is explicitly pointed out that embodiments of the system described herein also encompass embodiments in which the engaging part 201 and/or a unit of the second closing unit 300 which interacts with the engaging part 201 is/are not magnetic.

In one embodiment of the closing device 100 according to embodiments of the system described herein, the engaging part 201 and/or the magnetic unit 306 is/are formed as a permanent magnet. For example, the engaging part 201 and/or the magnetic unit 306 may be formed from a magnet made at least partly of neodymium. However, the system described herein is not limited to the aforementioned material as regards a magnet. Instead, any given magnetic materials which are suitable for embodiments of the system described herein may be used for the closing device 100 according to embodiments of the system described herein.

The magnetic unit 306 may delimit the cavity 304A in the form of the cut out of the second closing unit 300. The engaging part 201 of the first closing unit 200 in the closed position of the sliding unit 311 may be situated on the magnetic unit 306. For example, the engaging part 201 in the closed position of the sliding unit 311 abuts against the magnetic unit 306. This embodiment of the system described herein may ensure an especially good holding of the engaging part 201 of the first closing unit 200 in the cavity 304A in the form of the cut out of the second closing unit 300, especially in the closed position of the sliding unit 311.

As mentioned above, the magnetic unit 306 may comprise a first outer side 308 and a second outer side 309. The first outer side 308 may be oriented toward the opening 305 of the cavity 304A in the form of the cut out of the second closing unit 300. On the other hand, the second outer side 309 may be situated opposite to the first outer side 308. In particular, the first outer side 308 and the second outer side 309 of the magnetic unit 306 may be situated at a distance from each other. Moreover, in the closed position of the sliding unit 311, the sliding unit 311 may be situated on the second outer side 309 and the engaging part 201 on the first outer side 308. In particular, the engaging part 201 of the first closing unit 200 may lie against the first outer side 308 of the magnetic unit 306 in the closed position of the sliding unit 311. Moreover, the end cap 303A may have a protrusion 310A, against which the engaging part 201 may lie in the cavity 304A in the form of the cut out in the closed position of the sliding unit 311. This may enable an especially good holding of the engaging part 201, especially when it is shaped as a hemisphere, as represented in FIG. 14.

The extension of the cavity 304A in the form of the cut out of the second closing unit 300 may be larger than the extension of the opening 305 of the second closing unit 300. The extension of the cavity 304A in the form of the cut out may be dictated by the distance between two opposite points of the wall of the cut out, where the distance may be the length of a straight line oriented perpendicular to a longitudinal axis, and the longitudinal axis may run through the cut out and through the opening 305 of the second closing unit 300. Moreover, the extension of the opening 305 may be dictated by the distance of two opposite points of the boundary of the opening 305, where the distance may be the length of a straight line oriented perpendicular to a longitudinal axis, the longitudinal axis running through the cavity 304A in the form of the cut out and through the opening 305 of the second closing unit 300. For example, the opening 305 may be circular and/or cylindrical. In addition or alternatively, the cavity 304A in the form of the cut out may be cylindrical. If the cross section of the cavity 304A in the form of the cut out and the cross section of the opening 305 are circular, the diameter of the cavity 304A in the form of the cut out may be larger than the diameter of the opening 305. The diameter of the cavity 304A in the form of the cut out may be decreased in the closed position of the sliding unit 311, so that the diameter of the cavity 304A in the form of the cut out may be less than the extension of the engaging part 201. The engaging part 201 then may be held securely in the cavity 304A in the form of the cut out of the second closing unit 300. The engaging part 201 may have, for example, a first beveled surface 320A, which may interact with a second beveled surface 321A, situated on the protrusion 310A, solely in the closed position of the sliding unit 311. This configuration may bring about a good absorbing of any forces acting. In the open position of the sliding unit 311, the first beveled surface 320A may move at once away from the second beveled surface 321A.

In some embodiments, in the closed position of the sliding unit 311, a spherical engaging part 201 may be held rotatably in the cavity 304A in the form of the cut out. As already stated above, in one embodiment of the closing device 100 according to embodiments of the system described herein, the engaging part 201 may be made of iron.

The closing device 100 according to embodiments of the system described herein may be used in many areas of everyday life. When an object, such as an accessory, a piece of equipment, and/or a tool is/are not intended to be permanently secured to a person and/or to another object, a simple and reliable as well as releasable securing of the object to the person and/or to the other object may be provided by the closing device 100 according to embodiments of the system described herein. For example, the closing device 100 according to embodiments of the system described herein serves for the releasable fastening of equipment items on for example a bicycle, a wheelchair or a baby carriage. The closing device 100 according to embodiments of the system described herein also may be used for dog leashes, for the rigging of sailboats, for the fastening of sails in surfing or flying kites. Moreover, the closing device 100 according to embodiments of the system described herein also may be suited to the releasable fastening of tools, for example, on carrying vests. The closing device 100 according to embodiments of the system described herein also may be used in construction for the releasable securing of ropes for the guiding of building parts. The aforementioned listing of possible uses of the closing device 100 according to embodiments of the system described herein is not to be understood as definitive, but rather it is only an example. Accordingly, the closing device 100 according to embodiments of the system described herein may be used for any application to which the closing device 100 according to embodiments of the system described herein is suited, especially in the areas of sports, seafaring, the animal world, and industry.

All of the aforementioned components which are connected to each other may be screwed or welded together, for example. However, the system described herein is not limited to such connections. Instead, any connection which is suited to embodiments of the system described herein is conceivable.

The shapes and dimensions of the aforementioned components may be chosen according to the area of application.

The features of the system described herein as disclosed in the present description, in the drawings and in the claims may be significant to the realization of the invention in its various embodiments both individually and in any desired combinations. The invention is not limited to the embodiments described. It may be varied within the scope of the claims and considering the knowledge of the person skilled in the art. Other embodiments of the system described herein will be apparent to those skilled in the art from a consideration of the specification and/or an attempt to put into practice the system described herein. It is intended that the specification and examples be considered as illustrative only, with the true scope and spirit of the invention being indicated by the following claims.

In particular, the closing device according to embodiments of the system described herein, especially the first closing unit and/or the second closing unit, may have more components or also fewer components than was described above.

The invention claimed is:

1. A closing device for releasably connecting a first part to a second part, comprising:
a first closing unit, the first closing unit including an engaging part and a first retaining device mounted on the engaging part for attaching the first part; and
a second closing unit, which has a second retaining device for attaching the second part and a cut out which is delimited by a wall for receiving the engaging part of the first closing unit, the cut out of the second closing unit having an opening for inserting the engaging part of the first closing unit, and the engaging part of the first closing unit is held in a closed position of the closing device for the closing of the closing device in the cut out of the second closing unit;

wherein:
a sliding unit is located in the cut out of the second closing unit, said sliding unit being preloaded in the direction of the opening of the cut out of the second closing unit, where the sliding unit can be moved into an open position and a closed position along the wall of the cut out of the second closing unit in the cut out of the second closing unit, in the open position of the sliding unit, the engaging part of the first closing unit can be received in the cut out of the second closing unit through the opening of the cut out of the second closing unit, in the closed position of the sliding unit, the sliding unit delimits an extension of the cut out of the second closing unit, in the closed position of the sliding unit and in the closed position of the closing device, the engaging part of the first closing unit lies against both the wall of the cut out of the second closing unit and against the sliding unit and is held clamped between the wall of the cut out of the second closing unit and the sliding unit, the engaging part of the first closing unit is magnetic, and a magnetic unit is arranged in the cut out, which interacts with the magnetically formed engaging part of the first closing unit.

2. The closing device as claimed in claim 1, wherein the engaging part has a radius on an outer contour of the engaging part.

3. The closing device as claimed in claim 2, wherein the engaging part is rod shaped.

4. The closing device as claimed in claim 1, wherein the engaging part is spherical.

5. The closing device as claimed in claim 4, wherein in the closed position of the sliding unit the spherical engaging part of the first closing unit is held in the cut out in a rotatable manner.

6. The closing device as claimed in claim 5, wherein:
the spherical engaging part of the first closing unit has a longitudinal axis extending in the direction of the first retaining device, and
the spherical engaging part of the first closing unit is held in the cut out rotatably about the longitudinal axis.

7. The closing device as claimed in claim 5, wherein the closing device has one of the following features:
the spherical engaging part of the first closing unit is held in the cut out rotatably along an envelope surface of a cone, and a rotational axis of the spherical engaging part runs through an apex of the cone; and
the spherical engaging part of the first closing unit is held in the cut out rotatably along an envelope surface of a cone, and a rotational axis of the spherical engaging part runs through an apex of the cone, the apex of the cone being situated on a spherical formation of the spherical engaging part.

8. The closing device as claimed in claim 4, wherein:
the magnetic unit delimits the cut out of the second closing unit, and
the spherical engaging part is arranged on the magnetic unit in the closed position of the sliding unit.

9. The closing device as claimed in claim 4, wherein:
the magnetic unit comprises a first outer side and a second outer side,
the first outer side is oriented toward the opening of the cut out,
the second outer side is situated opposite the first outer side, and
in the closed position of the sliding unit, the sliding unit is arranged on the second outer side.

10. The closing device as claimed in claim 4, wherein the sliding unit has a prolongation, which extends along a side surface of the magnetic unit in the direction of the opening of the cut out.

11. The closing device as claimed in claim 4, wherein the second closing unit comprises a wall cut out, in which the magnetic unit is situated.

12. The closing device as claimed in claim 4, wherein:
the second closing unit comprises a spring element,
the spring element has a first end and a second end,
the first end of the spring element is braced against the sliding unit, and
the second end of the spring element is braced against a support wall of the second closing unit.

13. The closing device as claimed in claim 12, wherein the support wall is situated on the second retaining device for the mounting of the second part.

14. The closing device as claimed in claim 12, wherein:
the sliding unit is arranged on a first activating device, and
the first activating device is arranged on the support wall.

15. The closing device as claimed in claim 4, wherein:
the sliding unit is arranged on a second activating device, and
the second activating device is arranged on an outer side of the second closing unit.

16. The closing device as claimed in claim 4, wherein the extension of the cut out of the second closing unit is larger than an extension of the opening of the second closing unit.

17. The closing device as claimed in claim 4, wherein the second closing unit is sleeve shaped.

18. The closing device as claimed in claim 1, wherein the spherical engaging part is made of iron.

19. The closing device as claimed in claim 4, wherein:
the sliding unit is arranged on an activating device, and
the activating device is formed as a pressure switch for redirecting a force to move the sliding unit.

20. A closing device for releasably connecting a first part to a second part, comprising:
a first closing unit, the first closing unit including an engaging part and a first retaining device mounted on the engaging part for attaching the first part; and
a second closing unit, which has a second retaining device for attaching the second part and a cut out for receiving the engaging part of the first closing unit, the cut out of the second closing unit having an opening for inserting the engaging part of the first closing unit, and the engaging part of the first closing unit is held in a closed position of the closing device for the closing of the closing device in the cut out of the second closing unit,
wherein:
a sliding unit is located in the cut out of the second closing unit, said sliding unit being preloaded in the direction of the opening of the cut out of the second closing unit, and the sliding unit can be moved into an open position and a closed position along a wall of the cut out of the second closing unit in the cut out of the second closing unit,
in the open position of the sliding unit, the engaging part of the first closing unit can be received in the cut out of the second closing unit through the opening of the cut out of the second closing unit,
in the closed position of the sliding unit, the sliding unit limits an extension of the cut out of the second closing unit,
in the closed position of the sliding unit and in the closed position of the closing device, the engaging part of the first closing unit lies against both the wall of the cut out of the second closing unit and against the sliding unit and is held clamped between the wall of the cut out of the second closing unit and the sliding unit,
at one end of the second closing unit there is located an end cap,
the end cap has a cavity, which forms the cut out,
a wall encircling the cavity of the end cap forms the wall of the cut out, and
the end cap comprises the opening.

21. The closing device as claimed in claim 20, wherein the end cap includes at least one web, which protrudes into the second closing unit and forms the wall encircling the cavity.

22. The closing device as claimed in claim 20, wherein:
the engaging part of the first closing unit is magnetic, and
a magnetic unit is arranged on the cut out, which interacts with the magnetically formed engaging part of the first closing unit.

23. The closing device as claimed in claim 22, wherein:
the magnetic unit delimits the cut out of the second closing unit, and
the engaging part is arranged on the magnetic unit in the closed position of the sliding unit.

24. The closing device as claimed in claim 22, wherein:
the magnetic unit comprises a first outer side and a second outer side,
the first outer side is oriented toward the opening,
the second outer side is situated opposite the first outer side,
in the closed position of the sliding unit, the sliding unit is arranged on the second outer side, and
in the closed position of the sliding unit, the engaging part is situated on the first outer side.

25. The closing device as claimed in claim 20, having one of the following features:
the sliding unit has a prolongation, which extends in the direction of the opening; and
the sliding unit has a prolongation, which extends in the direction of the opening, the sliding unit being formed as a single piece with the prolongation.

26. The closing device as claimed in claim 20, wherein:
the second closing unit comprises at least one spring element,
the spring element has a first end and a second end,
the first end of the spring element is braced against the sliding unit, and
the second end of the spring element is braced against a support wall of the second closing unit.

27. The closing device as claimed in claim 20, wherein the extension of the cut out of the second closing unit is larger than an extension of the opening of the second closing unit.

28. The closing device as claimed in claim 20, wherein the engaging part has a radius on an outer contour of the engaging part.

29. The closing device as claimed in claim 20, wherein the engaging part is rod shaped.

30. The closing device as claimed in claim 20, wherein:
   the engaging part is spherical, and
   in the closed position of the sliding unit, the engaging part of the first closing unit is held in the cut out in rotatable manner.

31. The closing device as claimed in claim 20, wherein the engaging part is made of iron.

32. The closing device as claimed in claim 20, wherein the engaging part has a first beveled surface, and a protrusion of the end cap protruding into the cut out has a second beveled surface, the first beveled surface interacting with the second beveled surface only in the closed position of the sliding unit.

\* \* \* \* \*